United States Patent
Ohnishi et al.

(10) Patent No.: US 7,002,964 B1
(45) Date of Patent: Feb. 21, 2006

(54) COMMUNICATION SYSTEM, METHOD FOR A COMMUNICATION SYSTEM AND CONTROLLER FOR A COMMUNICATION SYSTEM

(75) Inventors: Shinji Ohnishi, Yokohama (JP); Takashi Kobayashi, Yokohama (JP); Shinichi Hatae, Kawasaki (JP); Mitsuo Niida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/252,925

(22) Filed: Feb. 19, 1999

(30) Foreign Application Priority Data

| Feb. 24, 1998 | (JP) | ................................. 10-042656 |
| Mar. 9, 1998 | (JP) | ................................. 10-057267 |
| Jun. 2, 1998 | (JP) | ................................. 10-153426 |

(51) Int. Cl.
  *H04L 12/28* (2006.01)
  *H04L 12/50* (2006.01)
  *G06F 15/16* (2006.01)
  *G06F 15/173* (2006.01)

(52) U.S. Cl. .............................. 370/395.2; 370/395.3; 370/412; 370/384; 709/228; 709/244

(58) Field of Classification Search ........ 370/254–257, 370/278, 447, 459, 462, 474–476, 498, 395.04, 370/395.2, 395.3, 400, 260, 261, 230, 410, 370/412, 432, 433, 395.1, 397, 396, 389, 370/395.6; 348/13, 10, 12, 385, 552; 725/86–91; 709/203, 204, 208, 209, 212, 216, 219, 228, 709/226, 242, 227; 381/61
See application file for complete search history.

(56) References Cited

U.S. PATENT DOCUMENTS

| 5,373,550 | A | * | 12/1994 | Campbell et al. ........... 379/100 |
| 5,546,388 | A | * | 8/1996 | Lin ............................ 370/389 |
| 5,661,517 | A | * | 8/1997 | Budow et al. ................ 348/13 |
| 5,812,772 | A | * | 9/1998 | Hasegawa .................... 709/202 |
| 5,825,752 | A | * | 10/1998 | Fujimori et al. ............ 370/260 |
| 5,856,975 | A | * | 1/1999 | Rostoker et al. ........... 370/395 |
| 5,877,812 | A | * | 3/1999 | Krause et al. ............. 348/385 |
| 5,883,621 | A | * | 3/1999 | Iwamura ..................... 345/327 |

(Continued)

FOREIGN PATENT DOCUMENTS

EP 0 682 430 A2 11/1995

(Continued)

OTHER PUBLICATIONS

U.S. Appl. No. 09/288,038, filed Apr. 8, 1999.

(Continued)

*Primary Examiner*—Hanh Nguyen
(74) *Attorney, Agent, or Firm*—Fitzpatrick, Cella, Harper & Scinto

(57) ABSTRACT

The present invention realizes a communication system and a method for a communication system including a source node, one or more destination nodes and a controller. The controller is adapted to notify the source node and the one or more destination nodes of first information representing the logical connection and second information that is unique to the controller, and the source node is adapted to divide data to be transmitted to the one or more destination nodes into a plurality of segment data, and transfer each of the segment data with the first and second information obtained from by the controller to the one or more destination nodes. In addition, each of the one or more destination nodes includes a receiving buffer, and is adapted to store each segment data in the receiving buffer.

9 Claims, 25 Drawing Sheets

U.S. PATENT DOCUMENTS

| | | | | |
|---|---|---|---|---|
| 5,987,501 | A * | 11/1999 | Hamilton et al. | 709/203 |
| 6,101,215 | A * | 8/2000 | Takeda et al. | 375/221 |
| 6,133,938 | A * | 10/2000 | James | 709/210 |
| 6,141,702 | A * | 10/2000 | Ludtke et al. | 709/253 |
| 6,151,634 | A * | 11/2000 | Glaser et al. | 709/236 |
| 6,191,822 | B1 * | 2/2001 | Smyers | 348/552 |
| 6,223,211 | B1 * | 4/2001 | Hamilton et al. | 709/203 |
| 6,266,334 | B1 * | 7/2001 | Duckwall | 370/397 |
| 6,272,114 | B1 * | 8/2001 | Kobayashi | 370/257 |
| 6,310,699 | B1 * | 10/2001 | Kawasaki | 358/434 |
| 6,438,613 | B1 * | 8/2002 | Yeung et al. | 709/250 |
| 6,462,832 | B1 * | 10/2002 | Malik | 358/1.15 |
| 6,567,177 | B1 * | 5/2003 | Matsuyama | 358/1.14 |
| 6,665,082 | B1 * | 12/2003 | Takeoka et al. | 358/1.15 |
| 2001/0042142 | A * | 2/1998 | Fukunaga et al. | 710/11 |
| 2002/0029271 | A1 * | 3/2002 | Schwager | 709/226 |

FOREIGN PATENT DOCUMENTS

| | | |
|---|---|---|
| EP | 0 766 428 A2 | 4/1997 |
| WO | WO97/38513 | 10/1997 |

OTHER PUBLICATIONS

U.S. Appl. No. 09/252,924, filed Feb. 19, 1999.
U.S. Appl. No. 09/253,783, filed Feb. 22, 1999.
U.S. Appl. No. 09/251,299, filed Feb. 17, 1999.
U.S. Appl. No. 09/252,926, filed Feb. 19, 1999.
U.S. Appl. No. 09/252,922, filed Feb. 19, 1999.
U.S. Appl. No. 09/021,268, filed Feb. 10, 1999.
U.S. Appl. No. 09/314,927, filed May 20, 1999.
U.S. Appl. No. 09/022,979, filed Feb. 12, 1998.
U.S. Appl. No. 09/186,485, filed Nov. 5, 1998.

* cited by examiner

TRANSFER MODEL (1 TO N)

COMMUNICATION SYSTEM, METHOD FOR A COMMUNICATION SYSTEM AND CONTROLLER FOR A COMMUNICATION SYSTEM

BACKGROUND OF THE INVENTION

1. Field of the Invention

The present invention relates to a communication system including a source node, one or more destination nodes and a controller.

2. Related Background Art

In the past, among peripheral equipments for a personal computer (referred to as "PC" hereinafter), hard discs and printers have been used most widely. Such a peripheral equipment has been connected to the PC via a multi-purpose digital interface such as an exclusive I/O interface or an SCSI (small computer system interface).

On the other hand, recently, AV (Audio/Visual) equipments such as digital cameras, digital video cameras or the like has also been noticed as one of the peripheral equipment for the PC. Such an AV (Audio/Visual) equipment has also been connected to the PC via an exclusive interface.

FIG. 1 is a view showing a conventional communication system including a PC and AV equipments.

In FIG. 1, the communication system includes an AV equipment (digital camera) 101, a PC 102 and a printer 103.

The digital camera 101 includes a memory 104 for compressing and storing a photo-taken image, a decoding unit 105 for effecting decoding by expanding the compressed image data stored in the memory 104, an image processing unit 106, a D/A converter 107, a display unit 108 comprised of an EVF, and an exclusive digital I/O unit 109 for connecting the digital camera 101 to the PC 102.

The PC 102 includes an exclusive digital I/O unit 110 for connecting the PC 102 to the digital camera 101, an operation unit 111 including a keyboard and a mouse, a decoding unit 112 for effecting decoding by expanding the compressed image data, a display 113, a hard disc 114, a memory 115 such as a RAM, an MPU 116, a PCI bus 117, and an SCSI interface 118 for connecting the PC 102 to the printer 103.

The printer 103 includes an SCSI interface 119 for connecting the printer 103 to the PC 102, a memory 120, a printer head 121, a printer controller 122 for controlling an operation of the printer 103, and a driver 123.

In the conventional communication system, the digital interface (digital I/O unit 109) of the digital camera 101 and the digital interface (SCSI interface 119) of the printer 103 has no interchangeability, so that the digital camera and the printer could not be interconnected directly. Thus, for example when a still image is desired to be sent from the digital camera 101 to the printer 103, the data had to be passed through the PC without fail.

Further, in the conventional exclusive interface and/or SCSI interface, particularly when large capacity data such as a moving image or a still image of the AV equipment is processed, there arose various problems that a data transfer rate becomes low, that a fat communication cable is required for parallel communication, that the number and kind of peripheral equipments capable of being connected are limited, that a connection system is limited and that real time data transfer cannot be effected.

As one of next generation high speed and high performance digital interfaces for solving the above problems, IEEE (The Institute of Electrical and Electronics Engineers, Inc.) 1394-1995 Standard is already known.

The digital interface based upon the IEEE 1394-1995 Standard (referred to as "1394 interface" hereinafter) has the following features:

(1) A data transfer speed is fast.
(2) A real time data transfer system (i.e., isochronous transfer system) and an asynchronous transfer system can be supported.
(3) A connection construction (topology) having high degree of freedom can be fabricated.
(4) A plug-and-play function and a hot-line insertion/withdrawal function are supported.

However, in the IEEE 1394-1995 Standard, although physical and electrical constructions of connectors and two fundamental data transfer systems are defined, there was no definition regarding how to transmit and receive what kind of data through what kind of data format on the basis of what kind of communication protocol.

Further, in the isochronous transfer system based upon the IEEE 1394-1995 Standard, since response to outgoing packets is not stipulated, it is not ensured whether each isochronous packet is positively received. Accordingly, when it is desired that continuous plural data are positively transferred or when it is desired that one file data is positively transferred while dividing it into plural data, the isochronous transfer system could not be used.

Furthermore, in the isochronous transfer system based upon the IEEE 1394-1995 Standard, even when there is vacancy in transfer band, the total number of transmissions is limited to sixty-four. Thus, when it is desired that many transmissions are effected with smaller transfer bands, the isochronous transfer system could not be used.

In addition, in the IEEE 1394-1995 Standard, if bus reset is generated in response to ON/OFF of a power source for nodes or connection/disconnection of the node, data transfer must be interrupted. However, in the IEEE 1394-1995 Standard, if the data transfer is interrupted due to the bus reset or error in transmission, it could not be known what kind of data contents are lost. Further, in order to restore the interrupted transfer, very complicated transmission sequence was required.

Incidentally, the bus reset refers to a function for automatically effecting recognition of new topology and the setting of address (node ID) assigned to each node. In the IEEE 1394-1995 Standard, this function can provide the plug-and-play function and the hot-line insertion/withdrawal function.

Further, in the communication system based upon the IEEE 1394-1995 Standard, communication protocol in which (although real time ability is not required) object data (for example, still image data, graphic data, text data, file data, program data and the like) having relatively large data amount are continuously transferred while dividing such data into one or more segment data was not proposed concretely.

Lastly, in the communication system based upon the IEEE 1394-1995 Standard, communication protocol in which data transmission between plural equipments is achieved by using a communication system for broadcasting data in an asynchronous transferring was not also proposed concretely.

SUMMARY OF THE INVENTION

An object of the present invention is to solve the above-described problems.

Another object of the present invention is to provide a technique in which object data not requiring real time ability can be transferred continuously and positively in a data transmission system, a data transmission method and a data transmission apparatus.

A further object of the present invention is to provide a technique in which, even when a logical connection relationship (i.e., connection) between a source node and one or more destination nodes is set by a plurality of controllers, connection set by other controller can easily be discriminated, thereby achieving more efficient data transmission, in a data transmission system, a data transmission method and a data transmission apparatus.

A still further object of the present invention is to provide a technique in which, even when a plurality of different logical connection relationships (i.e., connections) between a source node and one or more destination nodes are set, each connection can easily be discriminated, thereby achieving more efficient data transmission, in a data transmission system, a data transmission method and a data transmission apparatus.

As a preferred embodiment for such objects, the present invention discloses a communication system including a source node; one or more destination nodes; and a controller adapted to set a logical connection between the source node and the one or more destination nodes. The the controller is adapted to notify the source node and the one or more destination nodes of first information representing the logical connection and second information that is unique to the controller, and the source node is adapted to divide data to be transmitted to the one or more destination nodes into a plurality of segment data, and transfer each of the segment data with the first and second information obtained from the controller to the one or more destination nodes. In addition, each of the one or more destination nodes includes a receiving buffer, and is adapted to store each segment data in the receiving buffer.

As another embodiment, the present invention discloses a method for a communication system that includes a source node, one or more destination nodes, and a controller. The method includes the steps of setting a logical connection between the source node and one or more destination nodes; notifying the source node and the one or more destination nodes of first information representing the logical connection and second information that is unique to the controller; and dividing data to be transmitted to the one or more destination nodes into a plurality of segment data. The method also includes the steps of transferring each of the segment data with the first and second information obtained from the controller from the source node to the one or more destination nodes and storing each of the segment data in a receiving buffer of each of the one or more destination nodes.

As a further embodiment, the present invention discloses a controller including a control unit adapted to set a logical connection between a source node and one or more destination nodes, wherein the controller is adapted to notify the source node and one or more destination nodes of first information representing the logical connection and second information that is unique to the controller. The source node is adapted to divide data to be transmitted to the one or more destination nodes into a plurality of segment data, and transfer each of the segment data with the first and second information obtained from the controller to the one or more destination nodes and each of the one or more destination nodes includes a receiving buffer and is adapted to store each of the segment data in the receiving buffer.

The other objects and features of the present invention will be apparent from the following detailed explanation of preferred embodiment of the present invention.

DESCRIPTION OF THE PREFERRED EMBODIMENTS

The preferred embodiment of the present invention will now be described in detail hereinafter with reference to the accompanying drawings.

Figure 1:
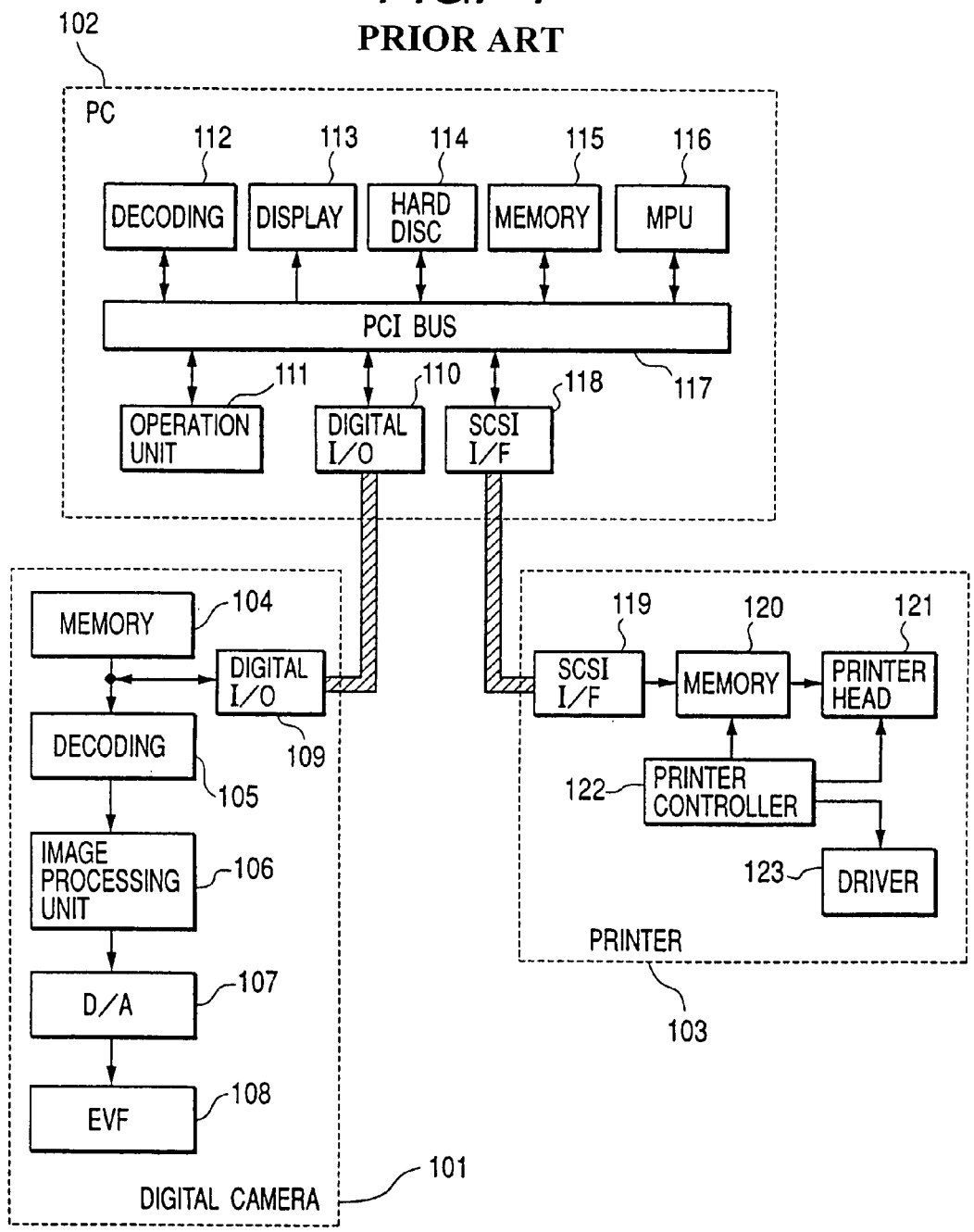
FIG. 1 is a view for explaining a conventional system.
Figure 2:
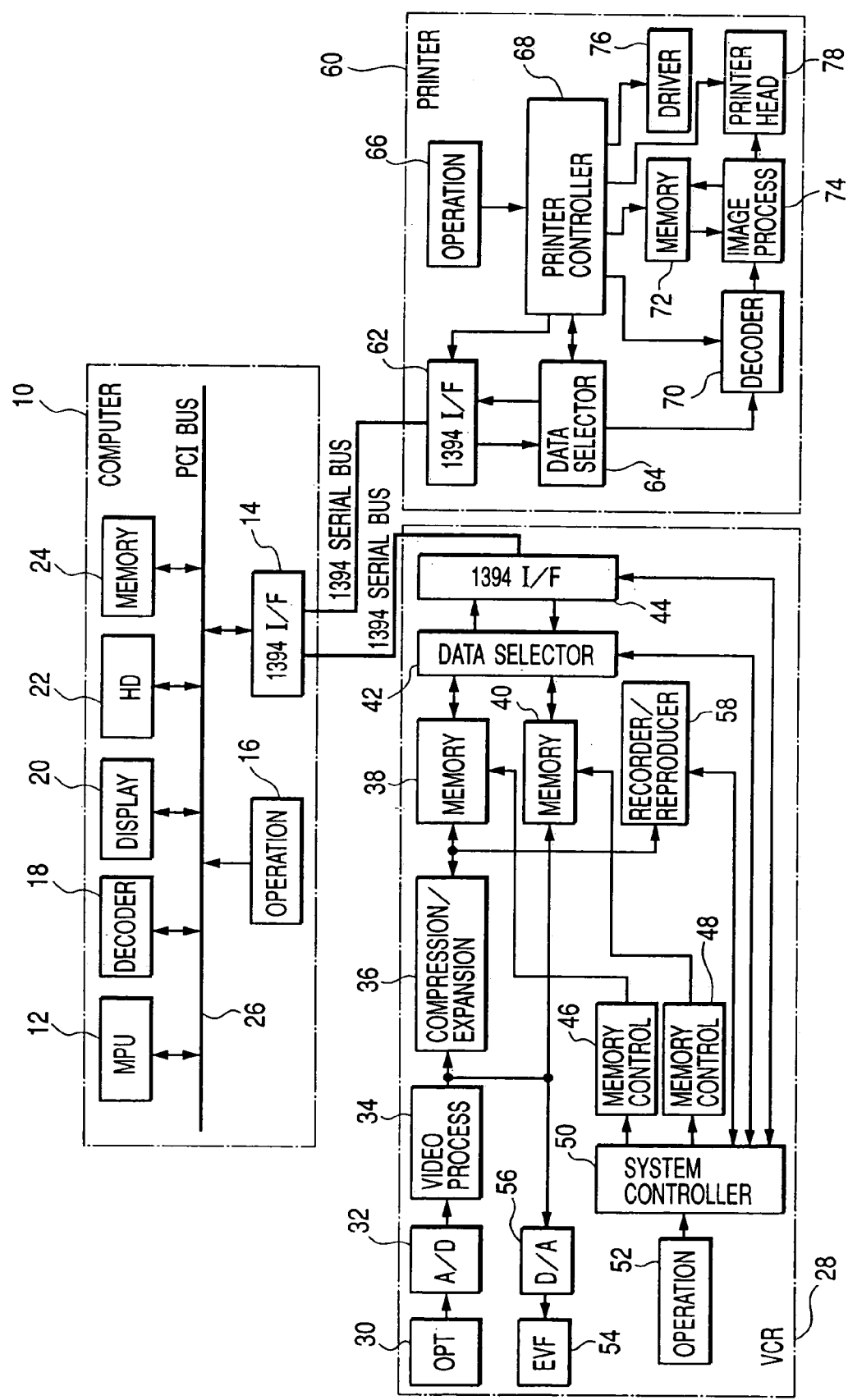
FIG. 2 is a block diagram showing an example of a construction of a communication system acceding to an embodiment.

FIG. 2 is a view showing an example of a construction of a data communication system according to an embodiment of the present invention. As shown in FIG. 2, the data communication system according to this embodiment is constituted by a computer 10, a camera integrating digital video recorder 28, and a printer 60.

First of all, a construction of the computer 10 will be described. The computer includes a calculation processing unit (MPU) 12 for controlling an operation of the computer 10, a 1394 interface 14 having a function for based upon the IEEE 1394-1995 Standard and a function regarding a communication protocol stipulated in this embodiment, an operation unit 16 comprised of a keyboard and a mouth, a decoder 18 for decoding compressed and coded digital data (moving image data, still image data, video data and the like), a display unit (display) 20 comprised of a display device such as a CRT display or a liquid crystal panel, a hard disc 22 for storing various digital data (moving image data, still image data, video data, graphic data, text data, program data and the like), an internal memory 24, and an internal bus 26 for interconnecting various processing units within the computer 10.

Next, a construction of the camera integrating digital video recorder (referred to as "DVCR" hereinafter) 28 will be described. The DVCR includes an imaging unit (opt) 30 for converting an optical image of an object into an electric signal and for supplying the electric signal to an analogue/digital (A/D) converter 32, an image processing unit 34 for converting digitalized moving image and still image into digital image data having predetermined format, a compression/expansion processing unit 36 having a function for decoding the compressed and coded digital data (moving image data, still image data, video data and the like) and a function for coding the digital image data with high efficiency (for example, as is in an MPEG system and a DV system, for quantigating and coding the data with variable length after orthogonally converting the data into predetermined image units), a memory 38 for temporarily storing the digital image data coded with high efficiency, a memory 40 for temporarily storing the digital image data not coded with high efficiency, a data selector 42, a 1394 interface 44 having a function for based upon the IEEE 1394-1995 Standard and a function regarding a communication protocol stipulated in this embodiment, memory control units 46, 48 for controlling writing and reading of the memories 38, 40, a control unit (system controller) 50 adapted to control an operation of the DVCR 28 and having a microcomputer, an operation unit 52 comprised of a remote controller and an operation panel, an electronic view finder (EVF) 54, a D/A converter 56, and a recorder/reproducer unit 58 comprised of a recording medium such as a magnetic tape, a magnetic disc, a photo-magnetic disc or the like and adapted to record and reproduce various data (moving image data, still image data, video data and the like).

Next, a construction of the printer 60 will be described. The printer includes a 1394 interface 62 having a function for based upon the IEEE 1394-1995 standard and a function regarding a communication protocol stipulated in this embodiment, a data selector 64, an operation unit 66 comprised of an operation button and a touch panel, a printer controller 68 for controlling an operation of the printer 60, a decoder 70, an internal memory 72, an image processing unit 74 for processing the still image data, text data, graphic data and the like received through the 1394 interface, a driver 76, and a printer head 78.

As shown in FIG. 2, various communication apparatuses (referred to as "nodes" hereinafter) such as the computer 10, DVCR 28 and printer 60 are connected to each other via the 1394 interfaces 14, 44, 62 (hereinafter, a network constituted by the 1394 interfaces is referred to as "1394 serial bus"). In the respective nodes, by defining predetermined communication protocols, sending and receiving of various object data (for example, moving image data, still image data, video data, graphic data, text data, program data and the like) and remote control based on command data can be performed. In the illustrated embodiment, a communication protocol using an asynchronous transfer system is defined.

Next, operations of respective nodes constituting the communication system according to the illustrated embodiment will be explained with reference to FIG. 2.

First of all, functions and operations of various processing units constituting the computer 10 will be described.

In the illustrated embodiment, for example, the computer 10 acts as a computer for controlling transmission and reception of image data between the DVCR 28 and the printer 60 or a computer for remotely controlling the DVCR 28 and the printer 60.

The MPU 12 serves to execute softward recorded in the hard disc 22 and to shift various data to the internal memory 24. Further, the MPU 12 also serves to adjust the various processing units connected to the MPU via the internal bus 26.

The 1394 interface 14 serves to receive the image data transferred onto the 1394 serial bus and to send the image data stored in the hard disc 22 or the internal memory 24 to the 1394 serial bus. Further, the 1394 interface 14 serves to transmit the command data for remotely controlling other nodes on the 1394 serial bus. In addition, the 1394 interface 14 has a function for transferring a signal transferred through the 1394 serial bus to other node.

The user or operator can select desired software via the operation unit 16 and cause the MPU 12 to execute the software stored in the hard disc 22. Information regarding the software is displayed to the user through the display unit 20. The decoder 18 serves to decode the image data received from the 1394 serial bus, on the basis of the software. The decoded image data is represented to the user through the display unit 20.

Next, functions and operations of various processing units constituting the DVCR 28 will be described.

In the illustrated embodiment, for example, the DVCR 28 acts as an image transmitting device (source node) for transferring the image data in an asynchronous transferring on the basis of the communication protocol according to the illustrated embodiment.

The imaging unit 30 serves to convert the optical image of the object into the electric signal comprised of a luminance signal (Y) and a color difference signal (C) and to supply the electric signal to the A/D converter 32. The A/D converter 32 serves to digitalize the electric signal.

The image processing unit 34 serves to effect predetermined image processing with respect to the digitalized luminance signal and color difference signal and to multiply the signals. The compression/expansion processing unit 36 serves to compress data amounts of the digitalized luminance signal and color difference signal. The compression/expansion processing unit 36 may process the luminance signal and the color difference signal in parallel by using independent compression processing circuits.

Further, in the compression/expansion processing unit 36, in order to increase resistance to transmission path error, the compressed image data is subjected to shuffling process. As a result, continuous code error (i.e., burst error) can be converted into scattered error (i.e., random error) which can easily be corrected or interpolated. When it is desired to make offset of information amount due to roughness/density of in the image uniform, before the compressing process, this process is effected. It is advantageous particularly when the coding with variable length such as run length is used.

In the compression/expansion processing unit 36, data discriminating information (ID) for restoring the shuffling is added to the compressed image data. Further, the compression/expansion processing unit 36 adds an error correction code (ECC) to the compressed image data in order to reduce error in recording/reproducing.

The image data compressed in the compression/expansion processing unit 36 is supplied to the memory 30 and the recorder/reproducer unit 58. The recorder/reproducer unit 58 serves to record the added compressed image data such as ID or ECC on a recording medium such as a magnetic tape. The compressed image data is recorded on an independent recording area different from the video data.

On the other hand, the image data supplied from the image processing unit 34 to the D/A converter 56 is D/A-converted. The EVF 54 serves to display an analogue image signal supplied from the D/A converter 56. Further, the image data processed in the image processing unit 34 is also supplied to the memory 40. Non-compressed image data is stored in the memory 40.

The data selector 42 selects the memory 38 or the memory 40 on the basis of the user's command and supplies the compressed image data or the non-compressed image data to the 1394 interface 44. Further, the data selector 42 supplies the image data supplied from the 1394 interface 44 to the memory 38 or the memory 40.

The 1394 interface 44 serves to transfer the compressed image data or the non-compressed image data in asynchronous transferring on the basis of a communication protocol according to the illustrated embodiment which will be described later. Further, the 1394 interface 44 serves to receive control command for controlling the DVCR 28 through the 1394 serial bus. The received control command is supplied to the control unit 50 through the data selector 42. The 1394 interface 44 sends back response to the control command.

Next, functions and operations of various processing units constituting the printer 60 will be described.

In the illustrated embodiment, for example, the printer 60 acts as an image receiving device (destination node) for receiving the image data transferred in the asynchronous transferring and for printing the image data, on the basis of the communication protocol according to the illustrated embodiment.

The 1394 interface 62 serves to receive the image data transferred in the asynchronous transferring and the control command through the 1394 serial bus. The 1394 interface 62 also serves to transmit response to the control command.

The received image data is supplied to the decoder 70 through the data selector 64. The decoder 70 serves to decode the image data and output a result to the image processing unit 74. The image processing unit 74 causes the memory 72 to temporarily store the decoded image data.

Further, the image processing unit 74 serves to convert the image data temporarily stored in the memory 72 into printing data and supply the print data to the printer head 78. The printer head 78 executes the printing under the control of the printer controller 68.

On the other hand, the received control command is inputted to the printer controller 68 through the data selector 64. The printer controller 68 performs various controls regarding the printing on the basis of the control data. For example, the printer controller controls sheet feed through the driver 67 and positioning of the printer head 78.

Next, constructions of the 1394 interfaces 14, 44, 62 according to the illustrated embodiment will be fully described with reference to FIG. 8.

The 1394 interface is functionally constituted by a plurality of layers. In FIG. 8, the 1394 interface is connected to the 1394 interface of other node via a communication cable 801 based upon the IEEE 1394-1995 Standard. Further, the 1394 interface has one or more communication ports 802, and each communication port is connected to a physical layer 803 included in a hardware portion.

Figure 8:
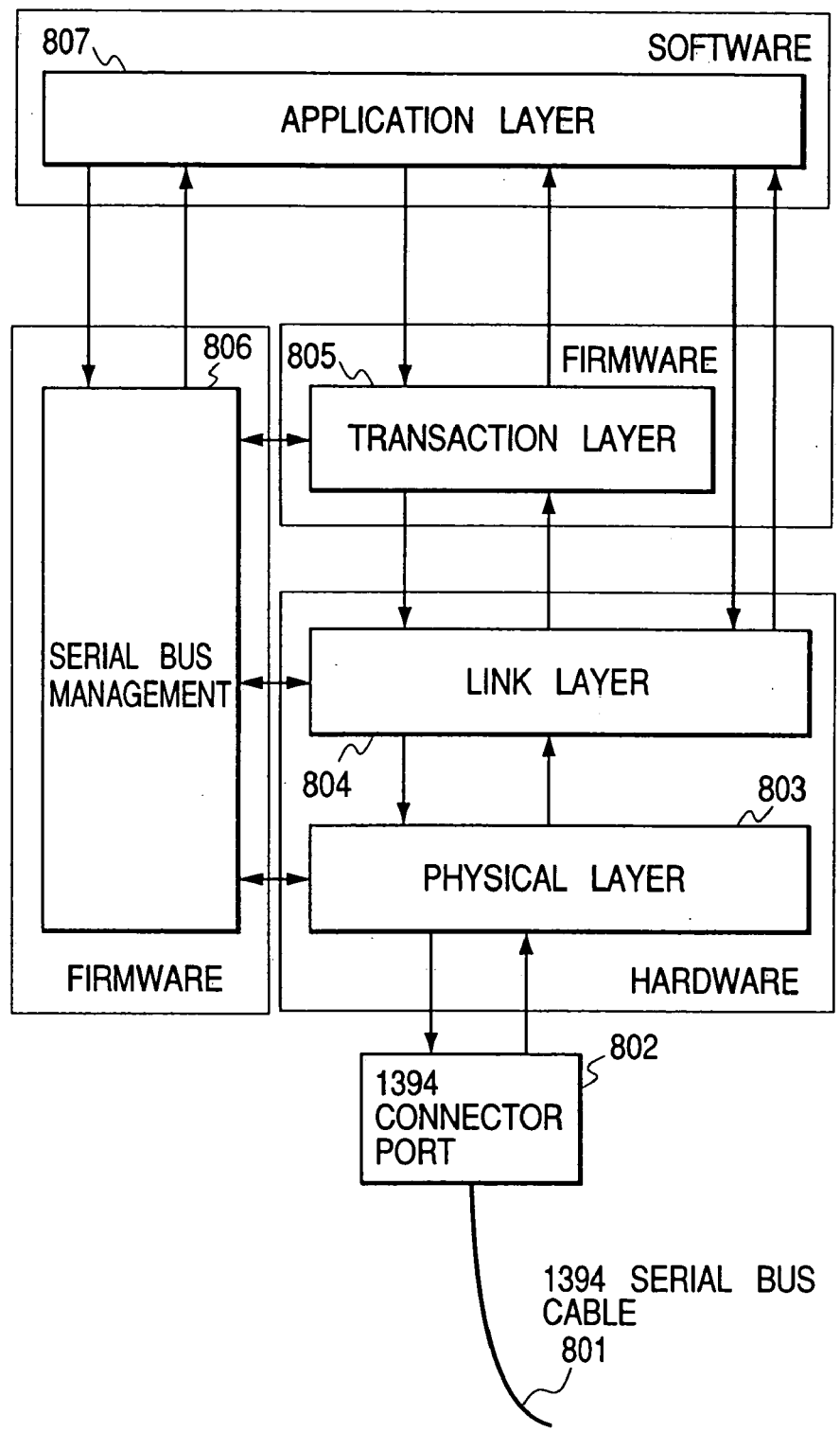
FIG. 8 is a view for explaining a construction of a 1394 interface according to the embodiment.

In FIG. 8, the hardware portion includes the physical layer 803 and a link layer 804. The physical layer 803 acts as a physical and electrical interface for other node and serves to effect detection of bus reset and processing therefor, coding/decoding of input and output signals and adjustment of bus usage right. The link layer 804 serves to effect formation of the communication packets, transmission and reception of various communication packets and control of a cycle timer. Further, the link layer 804 provides a function for performing formation and transmission/reception of an asynchronous broadcast packet which will be described later.

In FIG. 8, a firmware portion includes a transaction layer 805 and a serial bus management 806. The transaction layer 805 controls an asynchronous transfer system and provides various transactions (read, write, lock). Further, the transaction layer 805 provides an asynchronous broadcast transaction function which will be described later. The serial bus management 806 provides functions for effecting control of its node, management of a connection condition of its node, management of ID information of its node, and resources management of the serial bus network.

The hardware portion and the firmware portion shown in FIG. 8 substantially constitute the 1394 interface, and fundamental constructions thereof are stipulated in the IEEE 1394-1995 Standard.

An application layer 807 included in the software portion differs from each other depending upon application soft used and controls how to transfer what kind of object data.

The communication protocol according to the illustrated embodiment which will be described later serves to expand the functions of the hardware portion and the firmware portion which constitute the 1394 interface and provides a new transfer sequence to the software portion.

First Embodiment

Next, a fundamental construction of the communication protocol stipulated in the illustrated embodiment will be described with reference to FIG. 3.

Figure 3:
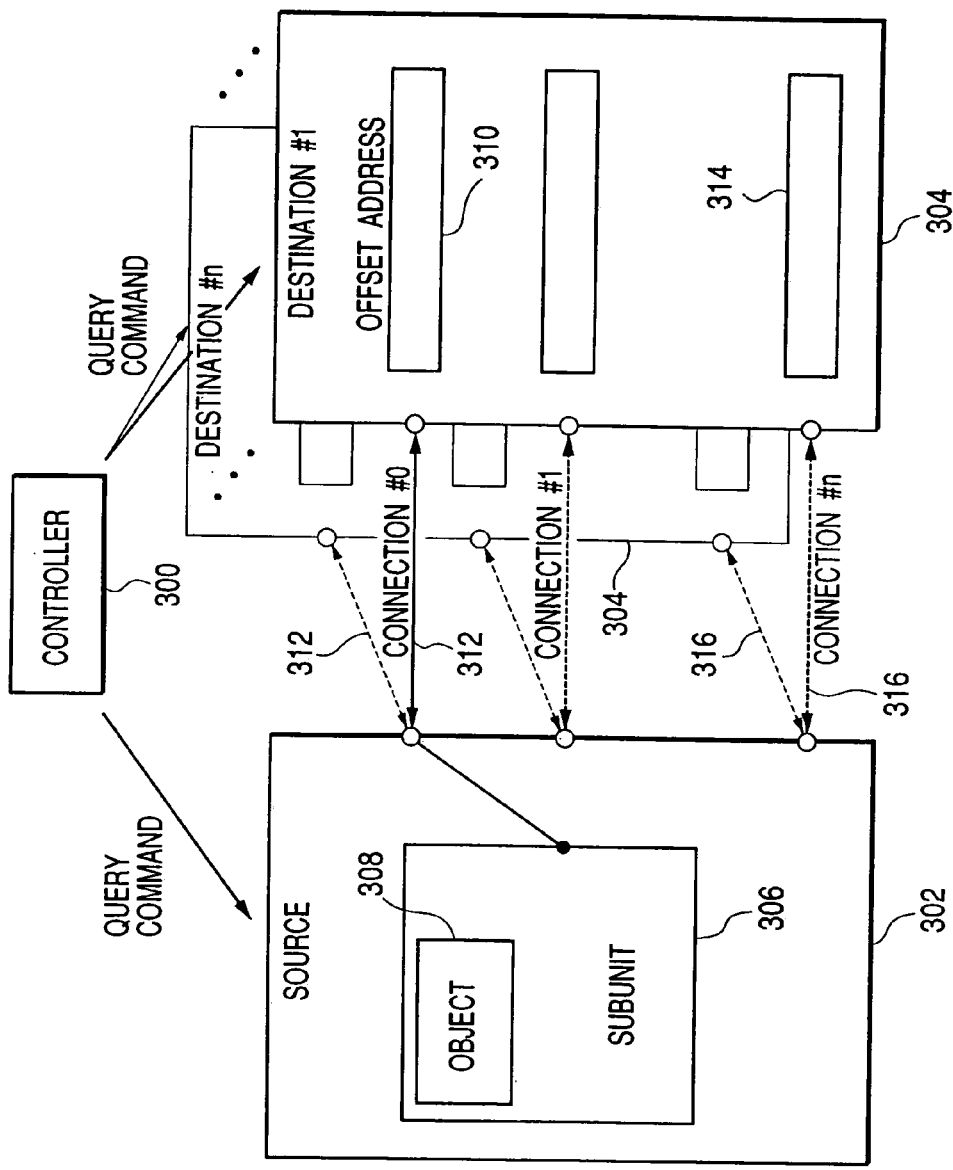
FIG. 3 is a conceptional view or explaining a fundamental construction of a communication protocol according to a first embodiment of the present invention.

In FIG. 3, the reference numeral 300 denotes a controller; 302 denotes a source node; 304 denotes n (n≧1) (number) destination nodes; 306 denotes a subunit of the source node; and 308 denotes object data such as still image data, graphic data, text data, file data, program data or the like.

The reference numeral 310 denotes a first memory space within the destination node 304 and is designated by predetermined destination offset (#0); and 312 denotes first connection showing a logical connection relationship (i.e., connection) between the source node 302 and the destination node 304. The destination offset means address for commonly designating the memory spaces of the n (number) destination nodes 304.

The reference numeral 314 denotes n-th memory space within the destination node 304 and is designated by predetermined destination offset (#n); and 316 denotes n-th connection showing a logical connection relationship (i.e., connection) between the source node 302 and the destination node 304.

In this embodiment, each node controls or governs the first memory space 310 to n-th memory space 314 on the basis of 64-bit address spaces based upon IEEE1212 CSR (Control and Status Register Architecture) Standard (or ISO/IEC 13213:1944 Standard). IEEE1212 CSR Standard is Standard for stipulating control, management and address assignment of serial bus.

Figure 6:
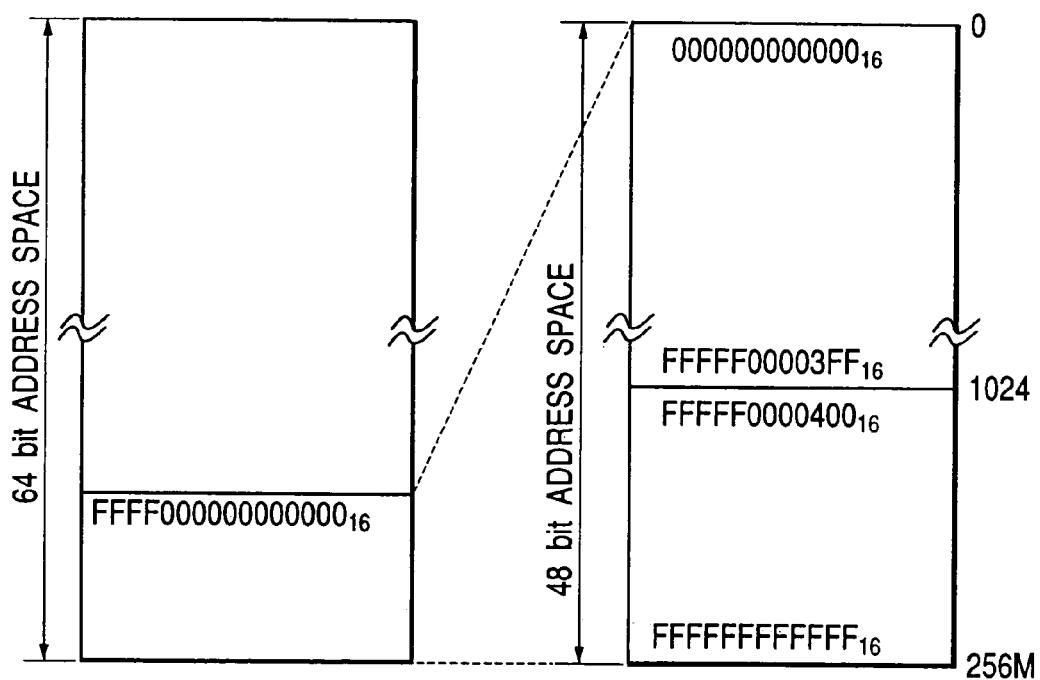
FIGS. 6A and 6B are views for explaining address spaces of respective nodes.

FIGS. 6A and 6B are views for explaining the address space of each node, where FIG. 6A shows a theoretical memory space represented by 64-bit address, and FIG. 6B shows a part of the memory space shown in FIG. 6A (for example, an address space where larger 16 bits become $FFFF_{16}$). The first memory space 310 to n-th memory space 314 shown in FIG. 3 use a part of the memory space shown in FIG. 6B. Each of the memory spaces 310–314 is designated by destination offset indicating lower 48 bits of the address.

In FIG. 6B, for example, $000000000000_{16}$ to $0000000003FF_{16}$ are reserved areas, and, areas where the object data 308 is actually written are areas where the lower 48 bits of the address become $FFFFF00004000_{16}$ and so on.

In FIG. 3, the source node 302 means a node having a function for transferring the object data 308 in accordance with the communication protocol which will be described later, and the destination node 304 means a node having a function for receiving the object data 308 transferred from the source node 302. Further, the controller 300 means a node having a function for setting a logical connection relationship (i.e., connection) between the source node 302 and one or more destination nodes 304 and for controlling the relation, in accordance with the communication protocol which will be described later.

The controller 300, source node 302 and destination node 304 may be operated in independent nodes. Alternatively, the controller 300 and the source node 302 may be operated in a single same node. Alternatively, the controller 300 and the destination node 304 may be operated in a single same node. In this case, the transaction between the controller 300 and the source node 302 or the destination node 304 can be omitted, thereby simplifying the communication sequence.

In the illustrated embodiment, a case where the controller 300, source node 302 and destination node 304 are operated in independent nodes will be explained. For example, the computer 10 having the 1394 interface 14 acts as the computer 300. Further, the DVCR 28 having the 1394 interface 44 acts as the source node 302 and the printer 60 having the 1394 interface 62 acts as the destination node 304.

In the illustrated embodiment, as shown in FIG. 3, one or more connections can be set between the source node 302 and one or more destination nodes 304. When it is required that certain object data be transferred, one or plural controllers 300 set such connections on the basis of the communication protocol which will be described later.

In the illustrated embodiment, the destination offset capable of being used in one connection can be set by one or by plural. A value of the destination offset may be a predetermined value or a value variably set by the controller 300 or the source node 302. Incidentally, a relation between the connection and the destination offset is set on the basis of the communication protocol which will be described later.

When a plurality of destination offsets are set regarding to one connection, data communication having plural patterns can be achieved by one connection. For example, by assigning different destination offsets to respective patterns of the data communication, data communications having 1:1, 1:N and N:N can be achieved simultaneously by one connection.

Incidentally, in the illustrated embodiment, the computer 10 as the controller 300 may be operated as the destination node 304. In this case, the connections are set between one source node 302 and two destination nodes 304 to transfer the object data 308.

Further, in the illustrated embodiment, while an example that the computer 10 is operated as the controller 300 was explained, it is not necessary that the computer 10 acts as the controller 300. The DVCR 20 or the printer 60 may be operated as the controller 300.

Next, a fundamental communication sequence of the communication protocol stipulated in the illustrated embodiment will be explained.

Figure 4A:
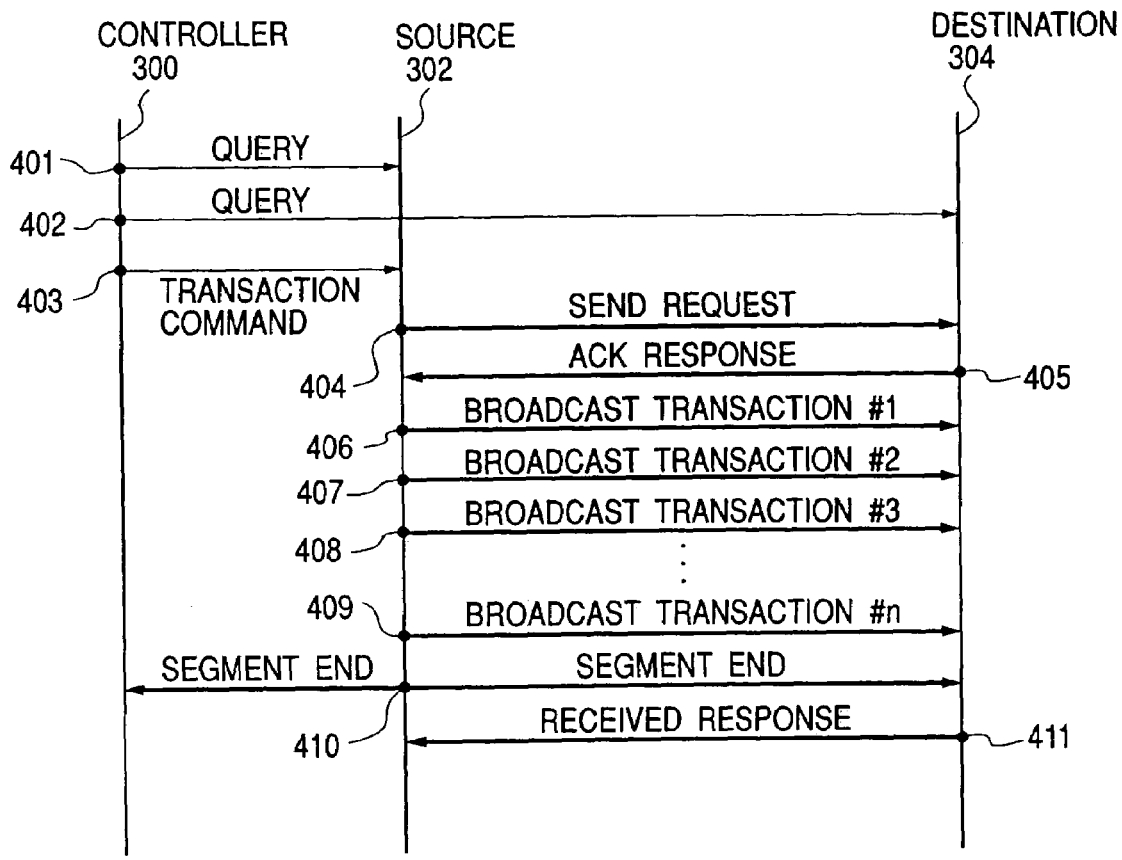
FIGS. 4A and 4B are sequence charts for explaining a fundamental communication sequence of the communication protocol according to the first embodiment.
Figure 4B:
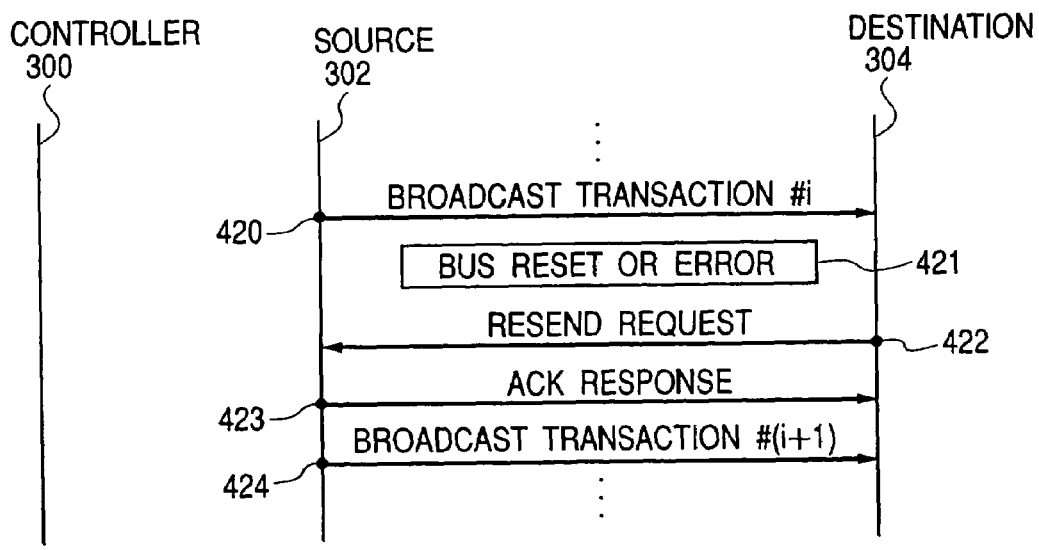

FIG. 4A is a sequence chart for explaining a sequence until one object data is transferred by using the connection set by a certain controller 300. FIG. 4B is a sequence chart for explaining a transfer sequence when bus reset or a transfer error occurs during the transferring of one object data.

In the communication protocol according to the illustrated embodiment, after the above-mentioned connection is set by the certain controller 300, one object data is transferred by one or more asynchronous broadcast transactions. A detailed communication sequence of the asynchronous broadcast transaction will be explained with reference to FIGS. 4A and 4B. Further, a packet used in the asynchronous broadcast transaction (referred to as "asynchronous broadcast packet" hereinafter) will be explained with reference to FIG. 5.

Incidentally, the above-mentioned asynchronous broadcast transaction and asynchronous broadcast packet are new communication sequence and packet format stipulated in the communication protocol according to the illustrated embodiment.

Now, a fundamental transfer sequence based on the communication protocol according to the illustrated embodiment will be described with reference to FIG. 4A.

The controller 300 sets connection ID for discriminating a logical connection relationship (connection) between the source node 302 and one or more destination nodes 304. Then, the controller 300 informs respective nodes of the connection ID and world wide unique ID of the controller itself and sets one connection (401, 402 in FIG. 4A).

After information of the connection ID, the controller 300 commands the source node 302 to start the transferring of the object data 308 (403 in FIG. 4A).

After the command for starting the transferring is received, the source node 302 executes negotiation with one or more destination nodes 304, thereby effecting initial setting of the asynchronous broadcast transaction (404, 405 in FIG. 4A).

After the initial setting is finished, the source node 302 executes the asynchronous broadcast transaction, thereby successively broadcasting the object data 308 including one or more segment data (406–409 in FIG. 4A).

Figure 7:
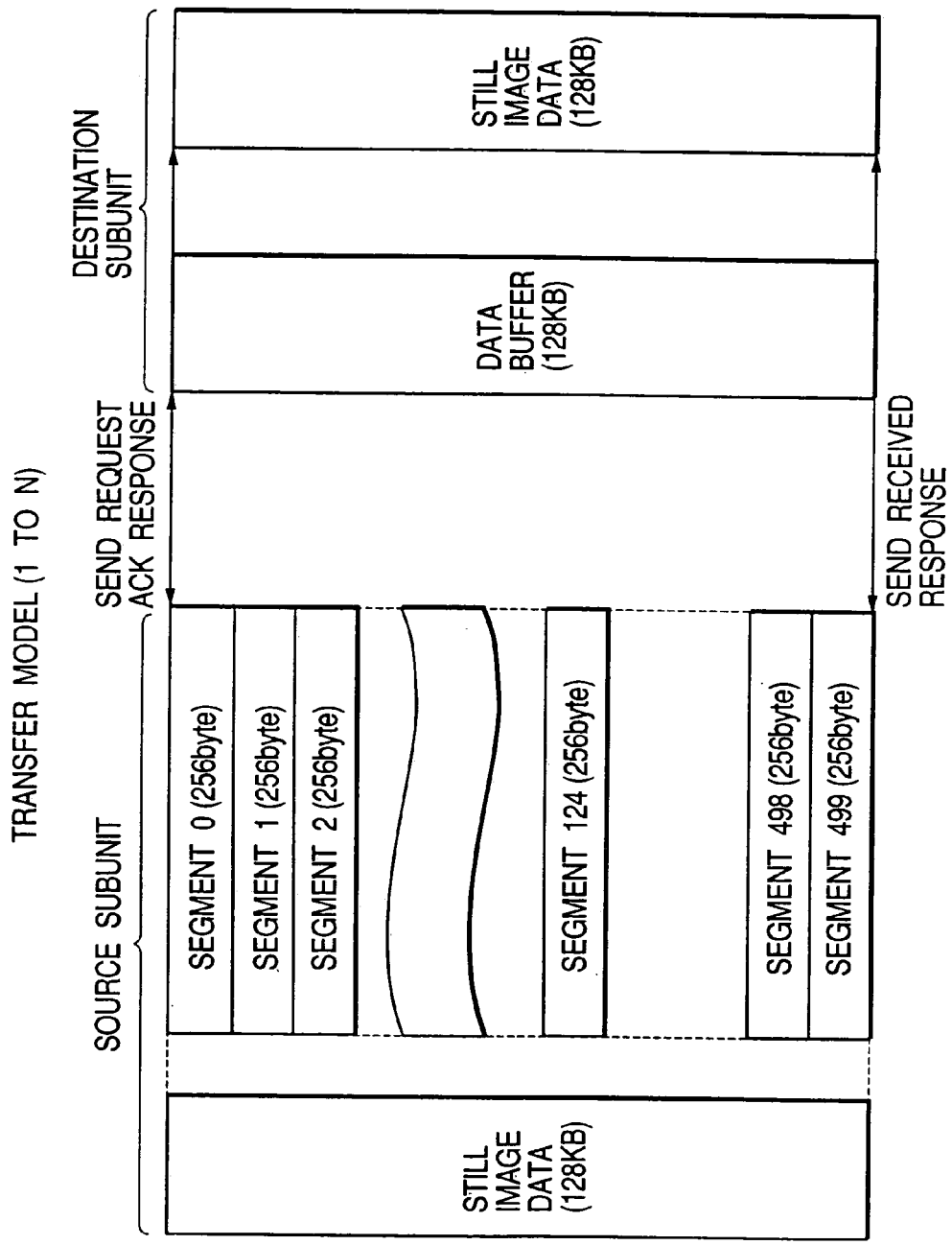
FIG. 7 is a view for explaining an example of a transfer model of object data in the first embodiment.

Now, a transfer mode of the object data in the illustrated embodiment will be described with reference to FIG. 7. In FIG. 7, for example, the object data is a still image data in which data size is 128 Kbytes.

The source node 302 divides the object data 308, for example, into 500 segment data (one segment data has 256 bytes) in accordance with the receiving ability of each destination node 304 discriminated in the initial setting. The data size of one segment data is variably set by the source node 302 on the basis of a size of an internal buffer of each destination node 304. FIG. 7 shows a case where the internal buffer having a size same as the data size of the object data 308 is reserved.

Further, the source node 302 transfers one or more segment data by using at least one asynchronous broadcast transaction. In FIG. 7, one segment data is transferred by using one asynchronous broadcast transaction.

After all of the segment data are transferred, the source node 302 finishes the data communication with respect to one or more destination nodes 304 (410, 411 in FIG. 4A).

Next, the operation of the controller 300 will be fully explained with reference to FIG. 4A.

The controller 300 transfers the packet for setting the connection (referred to as "connection setting packet" hereinafter) in the asynchronous transferring to the source node 302 and one or more destination nodes 304 selected by the user (401, 402 in FIG. 4A). The connection ID and the world wide unique ID are stored in a pay load of this packet.

Then, the controller 300 transfers a transaction command packet to the source node 302 in the asynchronous transferring (403 in FIG. 4A).

The source node 302 which received the transaction command packet effects the initial setting by using the connection ID and the world wide unique ID informed from the controller 300 and executes the asynchronous broadcast transaction (404–409 in FIG. 4A). By this asynchronous broadcast transaction, the source node 302 can transfer the object data 308 comprised of one or more segment data successively.

Incidentally, in the communication protocol according to the illustrated embodiment, the controller 300 provides a function for controlling connection/disconnection of the connection. Accordingly, the transferring of the object data 308 after the setting of the connection is executed by the negotiation between the source node 302 and the destination node 304.

After a series of asynchronous broadcast transactions are finished, the source node 302 broadcasts an asynchronous broadcast packet indicating segment end (referred to as "segment end packet" hereinafter) (410 in FIG. 4A).

After receiving the segment end packet from the source node 302, the controller 300 releases the connection, thereby finishing the data transferring (411 in FIG. 4A).

Since the segment end packet is transferred, the contents of the packet can also be detected in the destination node 304. Accordingly, in place of the controller 300, the destination node 304 itself may release the connection to the source node 302.

Next, the operation of the source node 302 will be fully explained with reference to FIG. 4A.

After receiving the connection setting packet and the transaction command packet from the controller 300, the source node 302 sends to each destination node 304 an asynchronous broadcast packet requesting data transferring (referred to as "send request packet" hereinafter) (404 in FIG. 4A).

The send request packet is a request packet for obtaining required initial information before execution of the asynchronous broadcast transaction of the object data 308. The connection ID and the world wide unique ID of the controller 300 designated by the controller 300 are written in this packet.

The destination node 304 broadcasts an asynchronous broadcast packet indicating the fact that packet corresponds to the send request packet (referred to as "ack response packet" hereinafter) (405 in FIG. 4A). Connection ID and world wide unique ID same as those in the send request packet are stored in the ack response packet. Accordingly, the source node 302 can discriminate the connection through which the ack response packet is transferred, by recognizing the connection ID and the world wide unique ID of the received packet.

A size of the internal buffer capable of being reserved in each destination node 304 and offset address designating a predetermined memory space are stored in the ack response packet. After receiving the ack response packet, the source node 302 sets destination offset for commonly designating the memory spaces of the destination nodes 304 and starts the asynchronous broadcast transaction. The destination offset is set by using offset address included in the ack response packet of each destination nodes 304.

Incidentally, in the illustrated embodiment, while an example that the destination offset used in the asynchronous broadcast transaction is set by using the offset address included in the ack response packet was explained, the present invention is not limited to such an example. For example, the controller 300 may have a function for controlling the destination offset used in each connection to set both the connection ID and the destination offset. In this case, the destination offset corresponding to each connection is informed from the controller 300 to the source node 302.

Then, the source node 302 writes the first asynchronous broadcast packet in the memory space indicating the above-mentioned destination offset (406 in FIG. 4A). The connection ID, the world wide unique ID and a sequence number of the segment data are stored in this packet.

After receiving the first asynchronous broadcast packet, the source node 302 is waiting for the response packet from the destination node 304. From the destination node 304, the response packet storing the connection ID, the world wide unique ID and the sequence number is sent in the form of the asynchronous broadcast packet. After receiving this response packet, the source node 302 effect increment of the sequence number and transfers the asynchronous broadcast packet including next segment data (407 in FIG. 4A).

By repeating such sequences, the source node 302 effects the asynchronous broadcast transactions successively (408, 409 in FIG. 4A). A maximum time period for waiting for the response from the destination node 304 is previously determined, and, if there is no response even when such a time period is elapsed, the same data is re-sent by using the same sequence number.

When the response packet requesting the re-sending is transferred from the destination node 304, the source node 302 can broadcast data of the designated sequence number again.

After the asynchronous broadcast transactions of all of the object data 308 are finished, the source node 302 broadcasts the segment end packet, thereby finishing the data transferring (410, 411 in FIG. 4A).

As mentioned above, the source node 302 divides the object data 308 into one or more segment data on demand (segmentation). The above-mentioned response packet is generated when the asynchronous broadcast transaction of each segment data is effected. The transferring of one segment data is effected by the single asynchronous broadcast transaction. The destination node 304 has a buffer having a capacity indicated by the above-mentioned buffer size.

Incidentally, in the above-mentioned example, while the response packet was sent out in accordance with the asynchronous broadcast transaction of one segment data without fail, the present invention is not limited to such an example. After the data buffer of the destination node 304 is filled with a plurality of continuous segment data, the destination node 304 may send the response packet.

Next, the operation of the destination node 304 will be fully explained with reference to FIG. 4A.

After receiving the connection setting packet from the controller 300, the destination node 304 is waiting for the send request packet from the source node 302 (404 in FIG. 4A).

The destination node 304 which received the send request packet recognizes the connection ID and the world wide unique ID written in this packet and judges whether or not this packet is sent from the source node 302.

After receiving the send request packet from the source node 302, each destination node 304 broadcasts the ack response packet in which the connection ID, the world wide unique ID, the size of the internal buffer capable of being reserved and the offset address designating the predetermined memory space (405 in FIG. 4A).

After the asynchronous broadcast packet transferred from the source node 302 is written in the memory space, the destination node 304 recognizes the connection ID and the world wide unique ID of this packet. When these connection ID and world wide unique ID coincide with values set by the controller 300, the response packet (including the connection ID, the world wide unique ID and the sequence number included in the received packet) is broadcasted (406–409 in FIG. 4A). In this case, the segment data included in the received packet is stored in the internal buffer. If the connection ID and the world wide unique ID differ from the connection ID and the world wide unique ID set for the destination node, the destination node 304 discards the received packet.

If the sequence number of the received packet is erroneous, the destination node 304 can send the response packet requesting the re-sending. In this case, the destination node 304 informs the source node 302 of the sequence number requesting the re-sending.

After all of the asynchronous broadcast transactions are finished, the segment end packet is broadcasted from the source node 302. When receiving this packet, the destination node 304 finishes the data transferring process (410 in FIG. 4A).

After receiving the segment end packet, the destination node 304 broadcasts a response packet indicating the fact that the segment end packet is correctly received (411 in FIG. 4A).

As mentioned above, the communication system according to the illustrated embodiment can eliminate the inconveniences of the conventional communication systems. Further, in the transferring of data which does not require the real time ability, the data can be transferred simply at a high speed.

Further, in the illustrated embodiment, after the connection is set by the controller 300, the transfer process of the object data is effected between the source node 302 and each destination node 304 without being controlled by the controller 300. As a result, a load on the controller can be reduced and a simple communication protocol having no complicated communication sequence can be provided.

Further, in the illustrated embodiment, destination node 304 is designed to return the response to each asynchronous broadcast transaction. As a result, a communication protocol in which the data not requiring the real time ability can positively be transferred can be provided.

In order to realize more positive data transferring, if the data transferring is interrupted due to occurrence of bus reset or any transfer error, it is required that the data transferring is re-started quickly without loosing the data. Now, the re-starting sequence stipulated by the communication protocol according to the illustrated embodiment will be described with reference to FIG. 4B.

For example, after receiving the asynchronous broadcast packet having the sequence number i, if the bus reset occurs, each node interrupts the transferring process and executes initialization of the bus, recognition of the connecting construction and setting of the node ID in accordance with the sequence stipulated by the IEEE 1394-1995 Standard (420, 421 in FIG. 4B).

After the re-construction of the bus is completed, each destination node 304 broadcasts a resend request packet in which the connection ID, the world wide unique ID and the sequence number i are stored (422 in FIG. 4B).

When the re-starting of the asynchronous broadcast transaction is permitted, the source node 302 recognizes the connection ID and the world wide unique ID of the received resend request packet and broadcasts the ack response packet in which the connection ID and world wide unique ID are stored (423 in FIG. 4B).

Thereafter, the source node 302 successively broadcasts the segment data subsequent to the sequence number requested by the received resend request packet, i.e., segment data having a sequence number (i+1) and so on (424 in FIG. 4B).

By the above-mentioned sequence, the controller 300, source node 302 and destination node 304 can restart subsequent data transferring easily and positively even if the data transferring is interrupted, without taking the node IDs thereof.

Further, as mentioned above, in the illustrated embodiment, even when the data transferring is interrupted, the control sequence of the controller 300 can be simplified.

Next, the construction of the asynchronous broadcast packet stipulated in the illustrated embodiment will be explained with reference to FIG. 5. For example, the asynchronous broadcast packet is a data packet having unit of 1 quadlet (4 bytes=32 bits).

First of all, a construction of a packet header 521 will be described.

Figure 5:
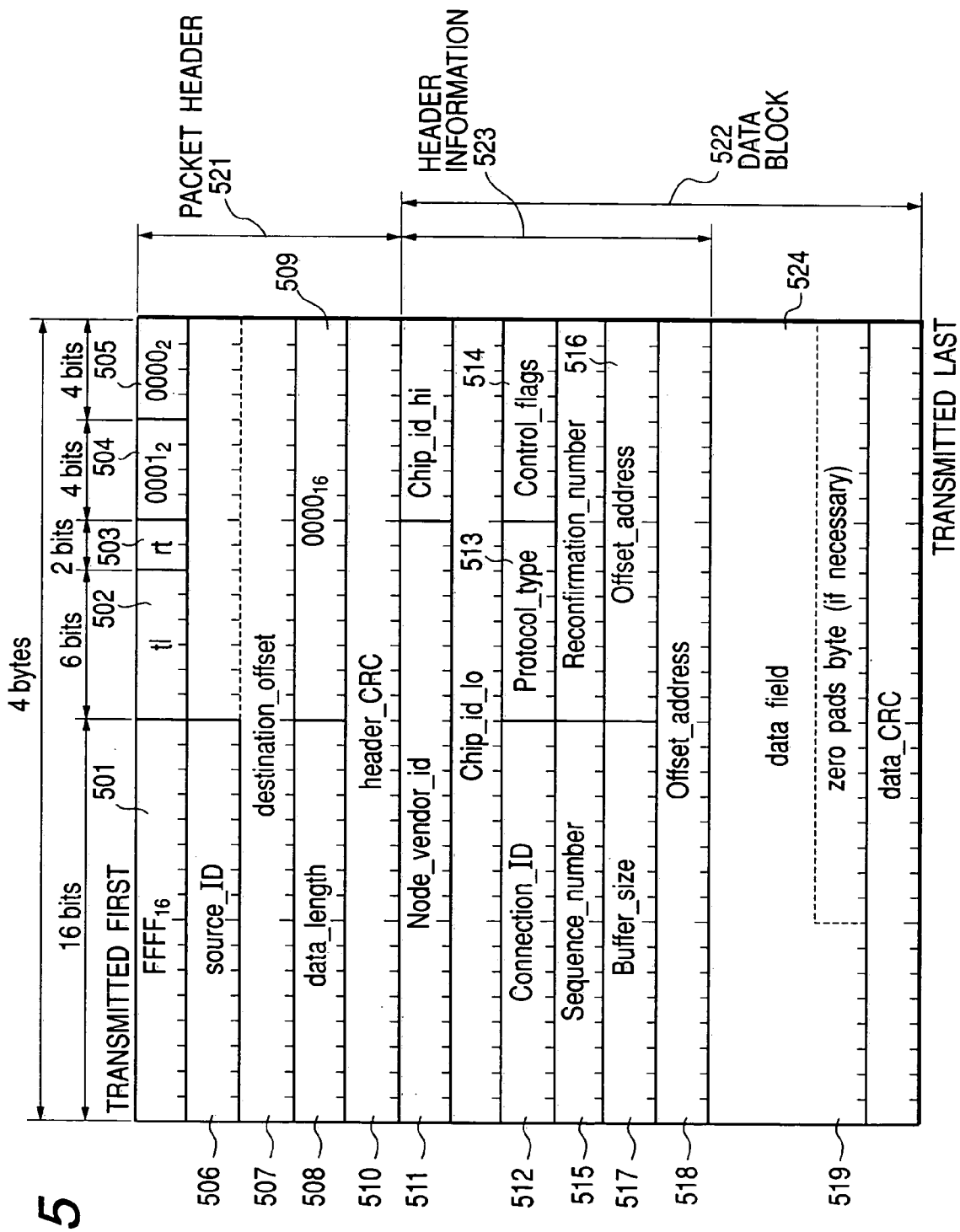
FIG. 5 is a view showing a construction of an asynchronous broadcast packet according to the first embodiment.

In FIG. 5, a field 501 (16 bits) indicates destination_ID and indicates node ID of the receiver (i.e., destination node 304). In the communication protocol according to the illustrated embodiment, in order to realize the asynchronous broadcast transaction of the object data 308, a value of this field is used as broadcast ID (i.e., "FFFF$_{16}$").

A field 502 (6 bits) indicates a transaction label (t1) field and is a tag inherent to each transaction.

A field 503 (2 bits) indicates a retry (rt) code and designates whether the packet tries retry or not.

A field 504 (4 bits) indicates a transaction code (tcode). The "tcode" designates format of the packet and type of the transaction to be executed. In the illustrated embodiment, a value of this field is regarded as "0001$_2$", for example, a process for writing a data block 522 of this packet in the memory space indicated by a destination_offset field 507 (i.e., write transaction) is requested.

A field 505 (4 bits) indicates priority (pri) and designates a preferential order. In the illustrated embodiment, a value of this field is regarded as "0000$_2$".

A field 506 (16 bits) indicates source_ID and indicates node ID of the sender (i.e., source node 302).

A field 507 (48 bits) indicates destination_offset and commonly designates lower 48 bits of the address space of each destination node 304. The destination_offset may be set to the same value in all of connections or may be set to a different value for each connection. However, when the destination_offset is set to the different value, since the asynchronous broadcast packets from a plurality of connections can be processed in parallel, it is mode efficiently.

A field 508 (16 bits) indicates data_length and indicates a length of the data field with a bite unit.

A field 509 (16 bits) indicates extended_tcode. In the illustrated embodiment, a value of this field is regarded as "0000$_2$".

A field 510 (32 bits) indicates header_CRC and error detecting codes for the fields 501 to 509 are stored in this field.

Next, a construction of the data block 522 will be described. In the illustrated embodiment, the data block 522 is constituted by header information 523 and data field 524.

Connection IDs for discriminating logical connection relationships (i.e., connections) between the nodes are stored in the header information 523. Incidentally, the construction of the header information 523 differs from each other in dependence upon the purpose of use.

The data field 524 is a field having variable length, and the above-mentioned segment data is stored in this field. If the segment data stored in the data field 524 is not multiple of the quadlet, a part short to the quadlet is filled with "0".

A field 511 (2 quadlets, 64 bits) is the world wide unique ID of the controller 300. The 1394 interface according to the illustrated embodiment discriminates the controller 300 by which the connection between the source node 302 and the destination node 304 is set, by using this world wide unique ID. The world wide unique ID is ID inherent to each node and based upon the IEEE 1394-1995 Standard.

Incidentally, in the illustrated embodiment, while an example that the world wide unique ID is used as the information for discriminating the controller setting the connection was explained, the present invention is not limited such an example. So long as each node can be discriminated inherently without being changed by the bus reset, other information may be used.

A field 512 (16 bits) indicates connection_ID and stores the connection ID according to the illustrated embodiment. The 1394 interface according to the illustrated embodiment discriminates the connection set between the source node 302 and one or more destination nodes 304, on the basis of the connection ID stored in this field. In the illustrated embodiment, one controller can establish $2^{16}$×(node number) connections. With this arrangement, until the total amount of communication bands or areas used by the connections reaches the capacity of the transfer path, a plurality of connections can be set.

Further, the 1394 interface according to the illustrated embodiment can discriminate absolute connections set between a certain source node 302 and one or more destination nodes 304, by using the above-mentioned world wide unique ID and connection ID. Accordingly, the plurality of controllers 300 can set the same connection ID regarding two different logical connection relationships. Namely, each controller can set and control the connection ID thereof regardless of the connection IDs set by other controllers.

A field 513 (8 bits) indicates protocol type, and, when the communication protocol according to the illustrated embodiment is indicated, a value of this field becomes "01$_{16}$", for example.

A field 514 (8 bits) indicates control_flags, and predetermined control data for controlling the communication sequence of the communication protocol according to the illustrated embodiment and the like is set in this field. In the illustrated embodiment, the highest bit of this field is used as a resend request flag, for example. Accordingly, when the highest bit of this field becomes "1", the fact that the resend request based on the communication protocol according to the illustrated embodiment is generated is indicated.

A field 515 (16 bits) indicates sequence_number and sets continuous values (i.e., sequence number) for the packet transferred on the basis of the particular connection ID (connection ID designated in the field 512). By this sequence number, the destination node 304 can monitor the continuity of the segment data successively subjected to the asynchronous broadcast transaction. If discord occurs, the destination node 304 can request the re-sending on the basis of this sequence number.

A field 516 (16 bits) indicates re-confirmation number. In the illustrated embodiment, this field has a meaning only when the value of the resend request flag is "1". For example, when the value of the resend request flag is "1", the sequence number of the packet requesting the re-sending is set in this field.

A field 517 (16 bits) indicates buffer_size. A buffer size of the destination node 304 is set in this field.

A field 518 (48 bits) indicates offset_address. Lower 48 bits of the address space of the destination node 304 is stored in this field. As a result, one of the first memory space 310 to n-th memory space 314 shown in FIG. 3 is designated.

A field 519 (32 bits) indicates data_CRC, and, similar to the header_CRC, error detecting codes for the header information 523 (fields 511–518) and the data field 524 are stored in this field.

Next, a way in which the identical connection IDs are set on a network by two controllers will be fully described with reference to FIG. 9. A controller A300 shown in FIG. 9 has node unique discrimination ID 901 which is not changed even if the bus reset and the like occurs. Here, the discrimination ID 901 is world wide unique ID based on the IEEE 1394-1995 Standard and a value thereof is set to "1", for example.

Figure 9:
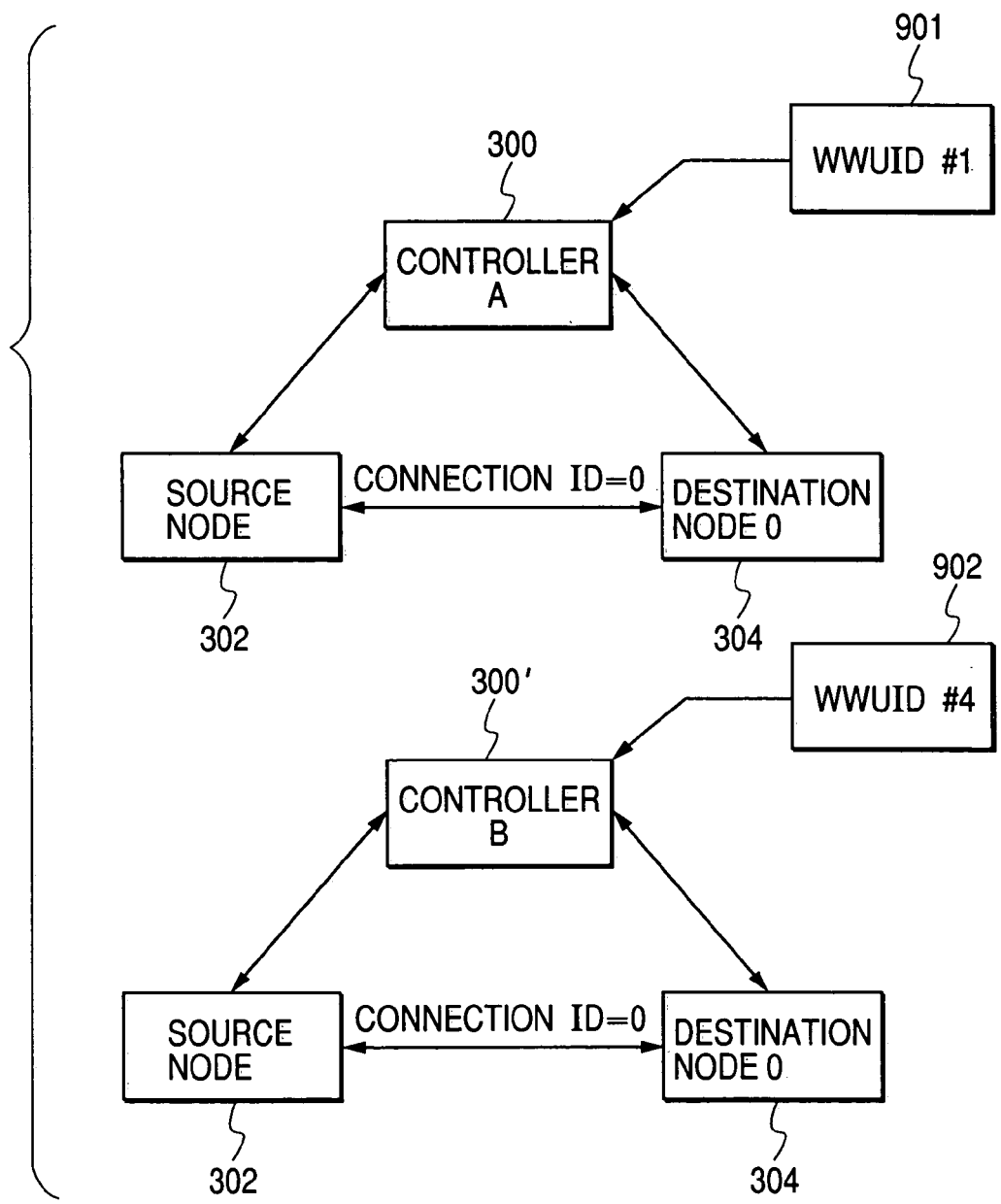
FIG. 9 is a view for explaining a way for setting identical connection IDs by a plurality of controllers.

Similar to the controller A300, a controller B300' shown in FIG. 9 has node unique discrimination ID 902 which is not changed even if the bus reset and the like occurs. Here, the discrimination ID 902 is world wide unique ID based on the IEEE 1394-1995 Standard and a value thereof is set to "4", for example. By the world wide unique IDs, the respective controllers A, B can set the identical connections between the same or different source node 302 and the destination node 304. In FIG. 9, the connection IDs are set to "0", for example.

When the identical connection IDs are set, the controllers A, B do not require negotiation for preventing overlapping of connection IDs between the controllers A and B.

When the connections is set, the controllers A, B inform the source node 302 and the destination node 304 of the connection ID and the node unique discrimination ID 901 (902) of the controllers A (B). As a result, the source node 302 and the destination node 304 can discriminate the connection and the controller by which the connection is set.

Next, a sequence for setting the connection and a sequence for releasing the connection effected by the controller 300 will be fully described and supplementary explanation of FIGS. 4A and 4B will be made.

(1) First of all, the controller 300 queries the N (N≧1) destination node 304 about the maximum pay load size (i.e., max_rec size) which is allowed in one asynchronous broadcast transaction and informs the destination node of the unique connection ID set by the controller 300. The destination node 304 indicates the max_rec size to the command from the controller 300 and returns the response showing the fact that the connection ID is set (1001 in FIG. 10).

Figure 10:
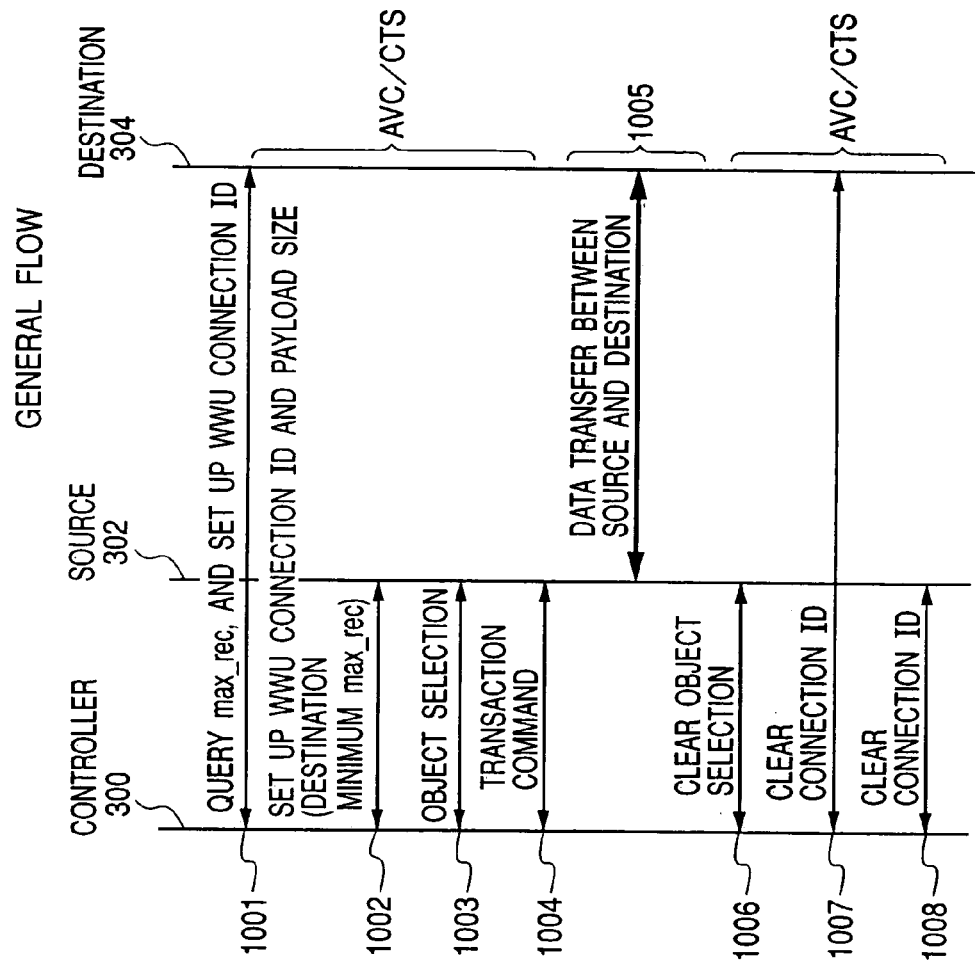
FIG. 10 is a view for explaining a setting sequence and a releasing sequence of the connection.

(2) Then, the controller 300 informs the source node 302 of the connection ID for discriminating the connection set by the controller 300, the world wide unique ID of the controller 300, the total number N of the destination nodes 304 theoretically connected by the connection, and the above-mentioned max_rec size (this value indicates the size of the pay load of the asynchronous broadcast packet send by the source node 302) (1002 in FIG. 10). The source node 302 returns the response indicating that they are set to the command from the controller 300.

(3) The controller 300 selects one object data 308 which is desired to be sent among the object data of the source node 302 (1003 in FIG. 10). The source node 302 returns the response indicating that the desired object data 308 is selected to the controller 300. The selected object data 308 may be a still image or a moving image. Alternatively, the object data may be text data or binary data.

(4) After the controller 300 recognizes the fact that the source node 302 can send the object data 308 on the basis of the response from the source node 302, the controller sends the command (i.e., transaction) for commanding the start of the sending of the object data 308 to the source node 302 (1004 in FIG. 10).

(5) When receiving the transaction command from the controller 300, the source node 302 starts the sending of the selected object data 308 (1005 in a FIG. 10). As mentioned above, the object data 308 is transferred to the destination node 304 by one or more asynchronous broadcast transactions.

(6) After the sending of the object data 308 is finished, the controller 300 releases the object data 308 of the source.

(7) At this point, the controller 300 queries the source node 302 about the fact that the sending of further object data is required or not. If yes, the above-mentioned sequences (3) to (6) are repeated.

(8) After all of the object data are sent, the controller 300 releases the previously set unique connection (1007, 1008 in FIG. 10).

Figure 11:
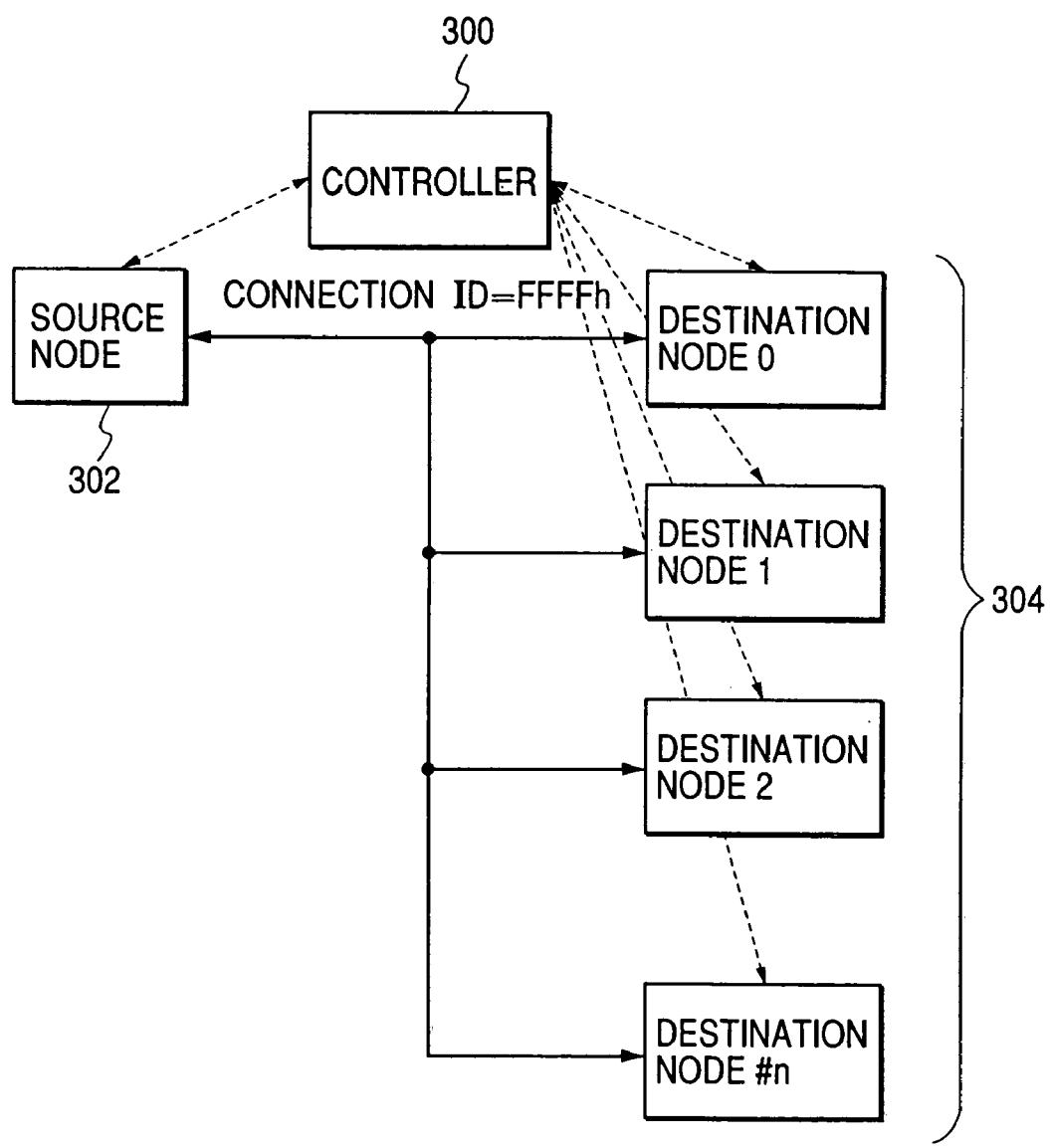
FIG. 11 is a view showing an example that one connection ID is set between one source node and N (number) destination nodes.

FIG. 11 shows a construction in which one connection ID is set between one source node 302 and N (number) destination nodes 304 on the network by one controller 300. In this case, the unique connection ID for discriminating the connections between the nodes is regarded as "FFFF" (16 scale). Incidentally, this value may be other value.

In this case, the sequence (1) shown in FIG. 10 is effected for respective destination nodes 304 and, thus, is repeated by N times.

Figure 12:
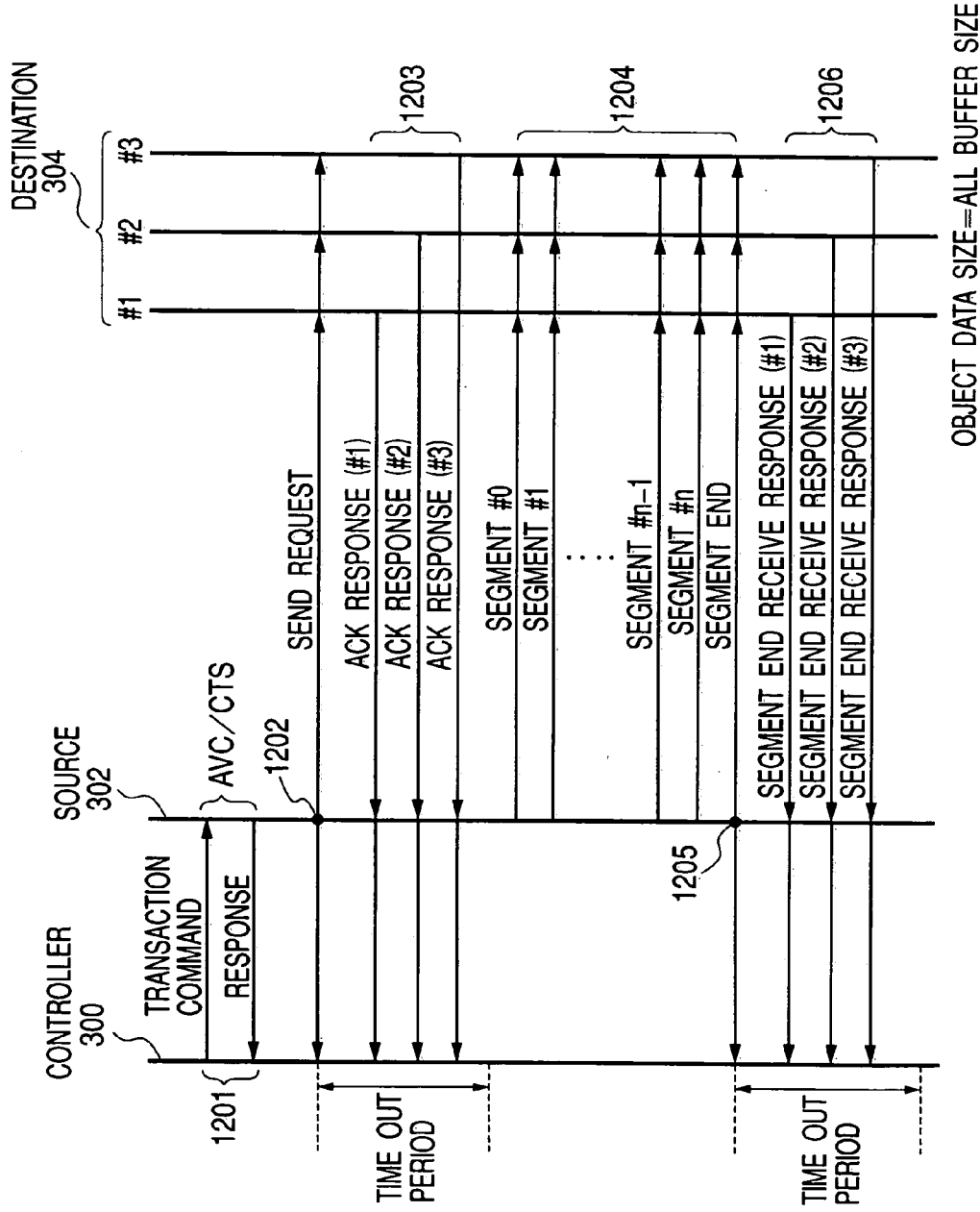
FIG. 12 is a view for explaining a transfer sequence when receiving buffer sizes of the N (number) destination nodes are equal.

Next, a communication sequence in which the respective destination nodes 304 have the same size receiving buffers and the sizes of the object data 308 are equal to the receiving buffers will be explained with reference to FIG. 12. In order to facilitate the explanation, it is assumed that the number N of the destination nodes 304 is three (N=3). In FIG. 12, the source node 302 recognizes the fact that there are three destination nodes connected by the same connection ID, on the basis of the sequences shown in FIG. 10 (1201 in FIG. 12).

(1) When the transaction command from the controller 300 is sent to the source node 302, the source node 302 broadcasts the connection request packet in accordance with the sequences shown in FIG. 4A (1202 in FIG. 12).

(2) At the point that preparation of receiving is completed, the three destination nodes 304 return the ack response packets including the sizes of the receiving buffers thereof (1203 in FIG. 12).

(3) After recognizing the fact that three ack response packets are returned, the source node 302 divides the object data 308 into predetermined pay load sizes on the basis of the sizes of the receiving buffers of the ack response packets and successively effects the broadcast until the buffer sizes of the respective destination nodes 304 are obtained 1204 in FIG. 12).

(4) In the last segment data of the all of the object data 308, the source node 302 sets a segment end flag indicating the end of the segment and sends it (1205 in FIG. 12).

(5) When receiving the segment end packet, each destination node 304 returns segment end receive response indicating the fact that the receiving of all of the object data 308 is completed (1206 in FIG. 12).

(6) After recognizing the fact that the segment end receive responses are returned from all of the destination nodes 304 the controller 300 and the source node 302 recognize the fact that the transferring of the object data 308 is finished.

Incidentally, the transfer model for the object data explained in connection with FIG. 12 can be represented in the similar manner as FIG. 7.

Figure 13:
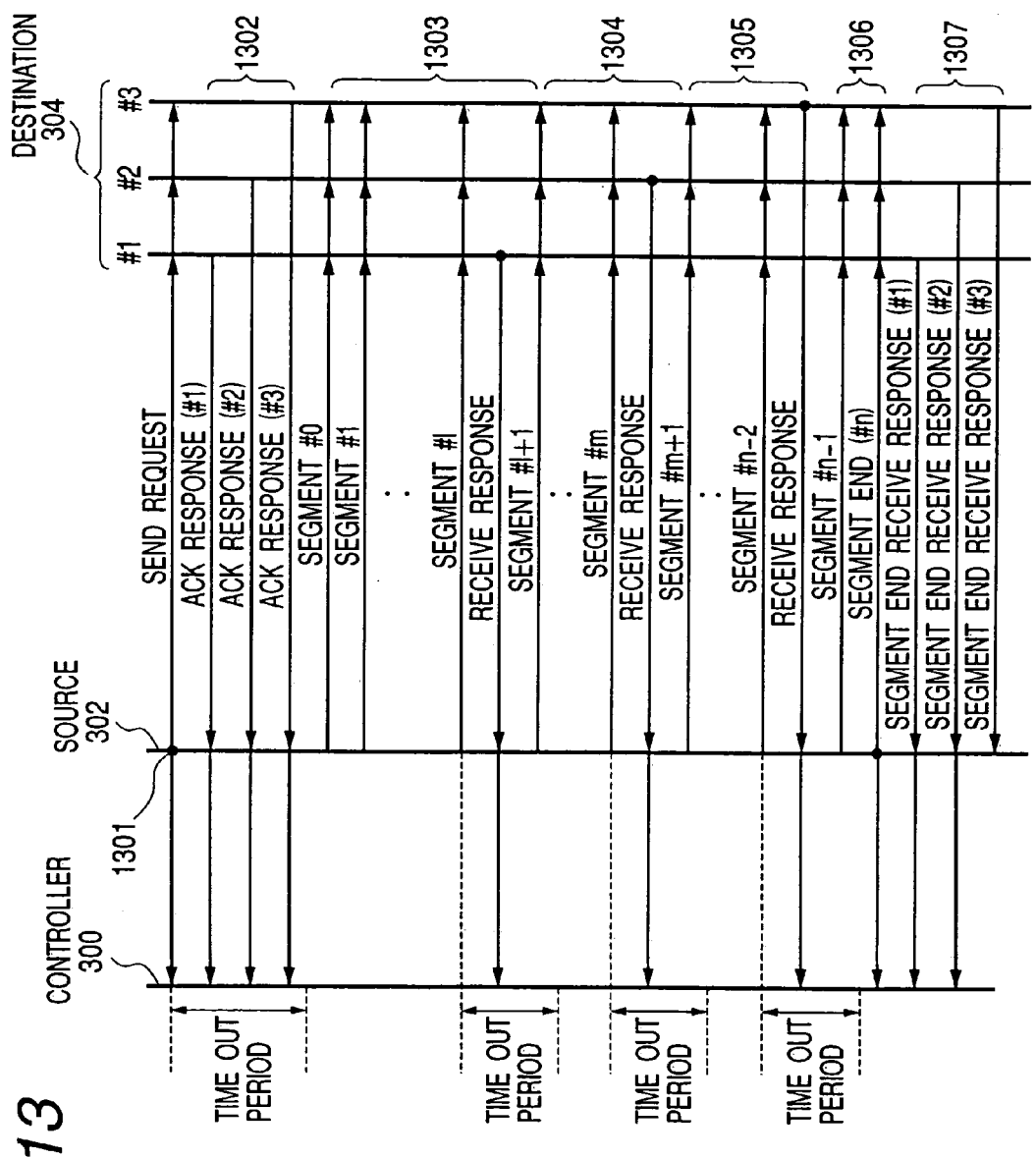
FIG. 13 is a view for explaining a transfer sequence when receiving buffer sizes of the N (number) destination nodes are different.

Next, a communication sequence in a network in which three destination nodes 304 have difference size buffers will be fully explained with reference to FIG. 13. In order to facilitate the explanation, it is assumed that the number N of the destination nodes 304 is three (N=3). In FIG. 13, the source node 302 has already been informed of the fact that there are thee destination nodes connected by the same connection ID, from the controller 300.

(1) When the transaction command from the controller 300 is sent to the source node 302, the source node 302 broadcasts the connection request packet in accordance with the sequences shown in FIG. 4A (1301 in FIG. 13).

(2) At the point that preparation of receiving is completed, the three destination nodes 304 return the ack response packets including the sizes of the receiving buffers thereof (1302 in FIG. 13).

(3) After recognizing the fact that three ack response packets are returned, the source node 302 divides the object data 308 into predetermined pay load sizes on the basis of the sizes of the receiving buffers of the ack response packets. And, the source node successively effects the broadcast until a minimum receiving buffer among the three destination nodes 304 is filled, and is waiting for the receive response from the destination node 304 having the minimum buffer (1303 in FIG. 13).

(4) After receiving the receive response packet from the destination node 304 (Destination #1 in FIG. 13) having the minimum buffer, the source node 302 further effects the broadcast successively until the buffer size of a larger receiving buffer is obtained, and is waiting for the receive response packet from the next destination node 304 (1304 in FIG. 13).

(5) After receiving the receive response packet from the second destination node 304, the source node 302 further effects the broadcast successively until the buffer size of the largest receiving buffer is obtained, and is waiting for the receive response packet from the next destination node 304 (1305 in FIG. 13).

(6) After the above-mentioned sequences are repeated, the source node 302 broadcasts the last segment data in which the segment end flag is set and is waiting for segment end receive responses from the respective destination nodes 304 (1306 in FIG. 13).

(7) After receiving the segment end receive responses from all of the destination nodes 304, the controller 300 and the source node 302 recognize the fact that the transferring of the object data 308 is finished (1307 in FIG. 13).

Figure 14:
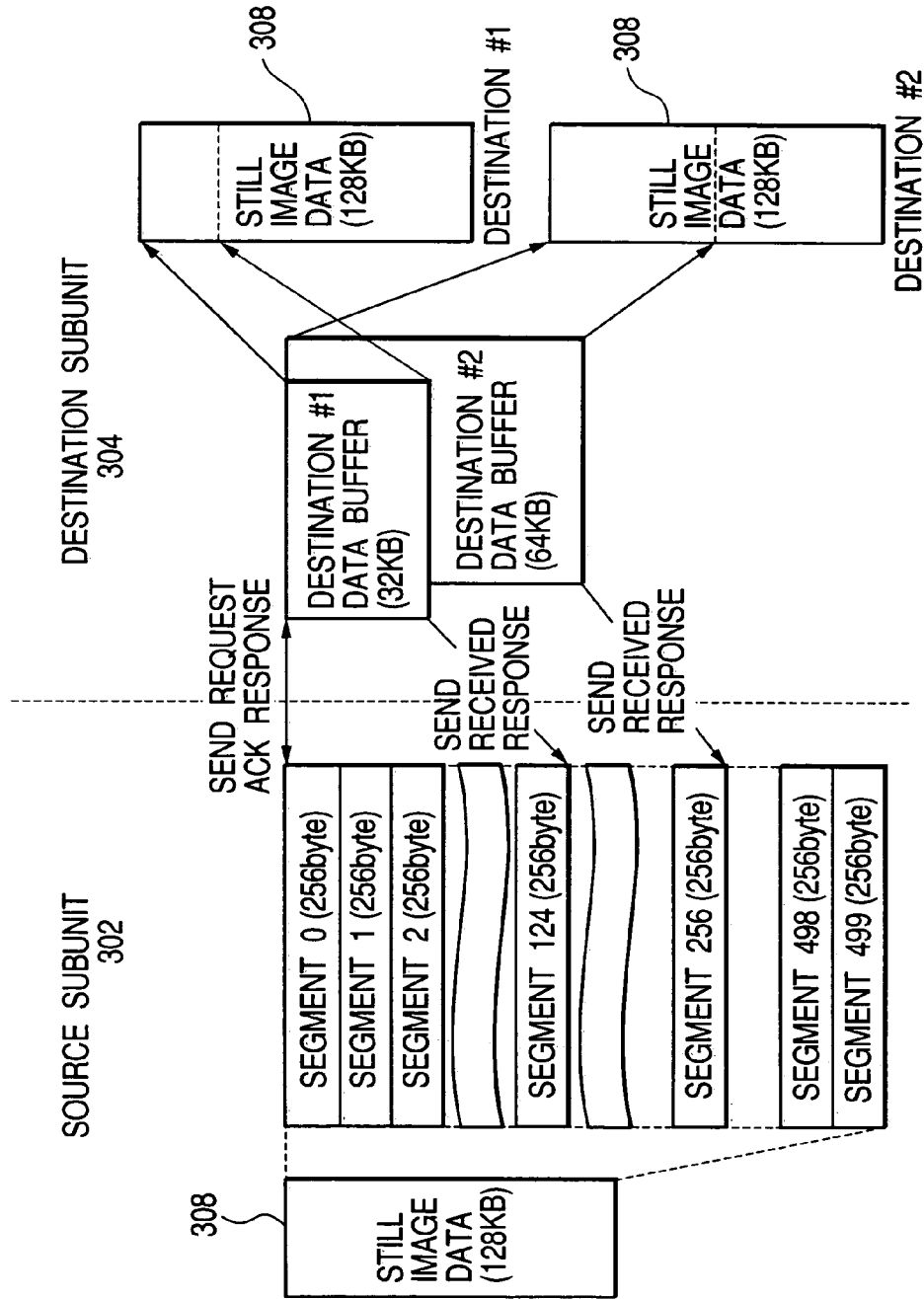
FIG. 14 is a view for explaining another example of a transfer model of object data in the first embodiment.

Next, a transfer model of the object data in FIG. 13 will be explained with reference to FIG. 14. In order to facilitate the explanation, it is assumed that the number N of the destination nodes 304 is two (N=2). Incidentally, in FIGS. 15A and 15B, while an example that the object data 308 of the source node 302 is a still image having data size of 128 Kbytes will be explained, the present invention is not limited to such an example, but the data size is variable. Further, the object data 308 is not limited to the still image but may be text data or binary data.

When it is assumed that the pay load size of one asynchronous broadcast packet is 256 bytes, the source node 302 divides the object data 308 into 500 segment data and successively broadcasts the respective segment data until the buffer size of Destination #1 is obtained. After the receiving buffer is filled, the Destination #1 returns the receive response packet. The source node 302 further continues to broadcast successively until the receiving buffer of Destination #2 is filled.

In this example, while the buffer size of the Destination #2 is twice of the buffer size of the Destination #1, the present invention is not limited to such an example. As mentioned above, in FIGS. 15A and 15B, the Destination #1 returns three (in total) segment receive responses and the Destination #2 returns two segment receive responses.

Next, a transfer re-starting sequence in the asynchronous broadcast transaction between one source node 302 and a plurality of destination nodes 304 will be explained with reference to FIGS. 15A and 15B. FIG. 16 shows the restoring sequence particularly when the bus reset occurs. As mentioned above, the bus reset occurs in accordance with change in connecting structure and ON/OFF of power source of each node.

Figure 15A:
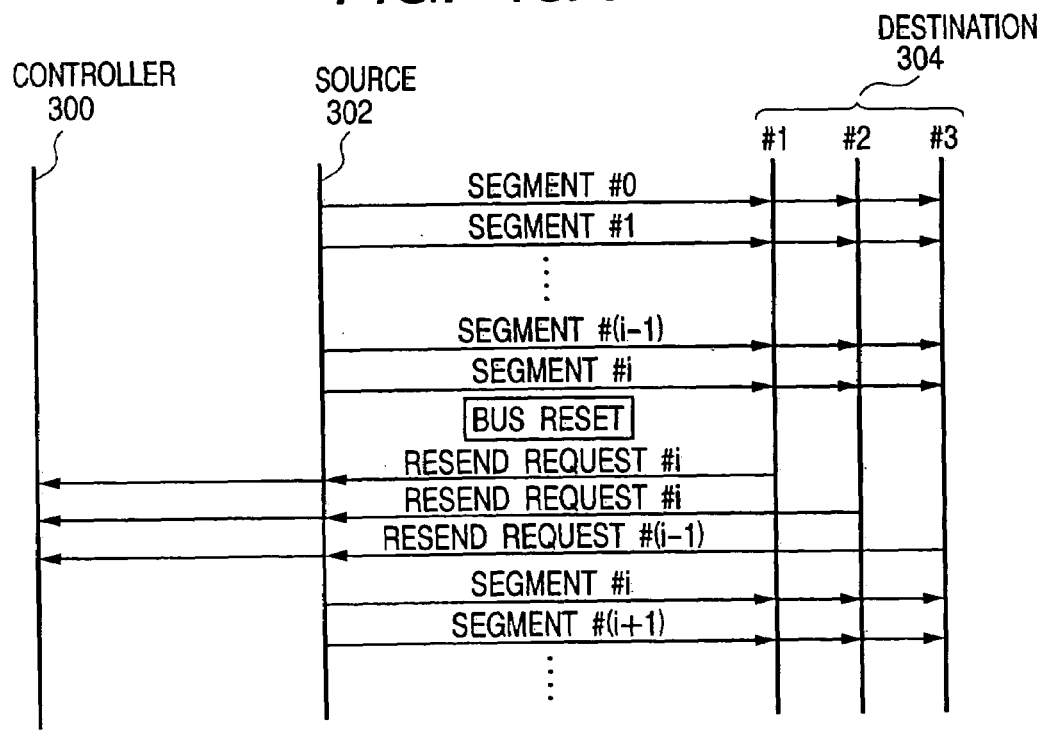
FIGS. 15A and 15B are sequence charts for explaining a transfer re-starting sequence between one source node and N (number) destination nodes.
Figure 15B:
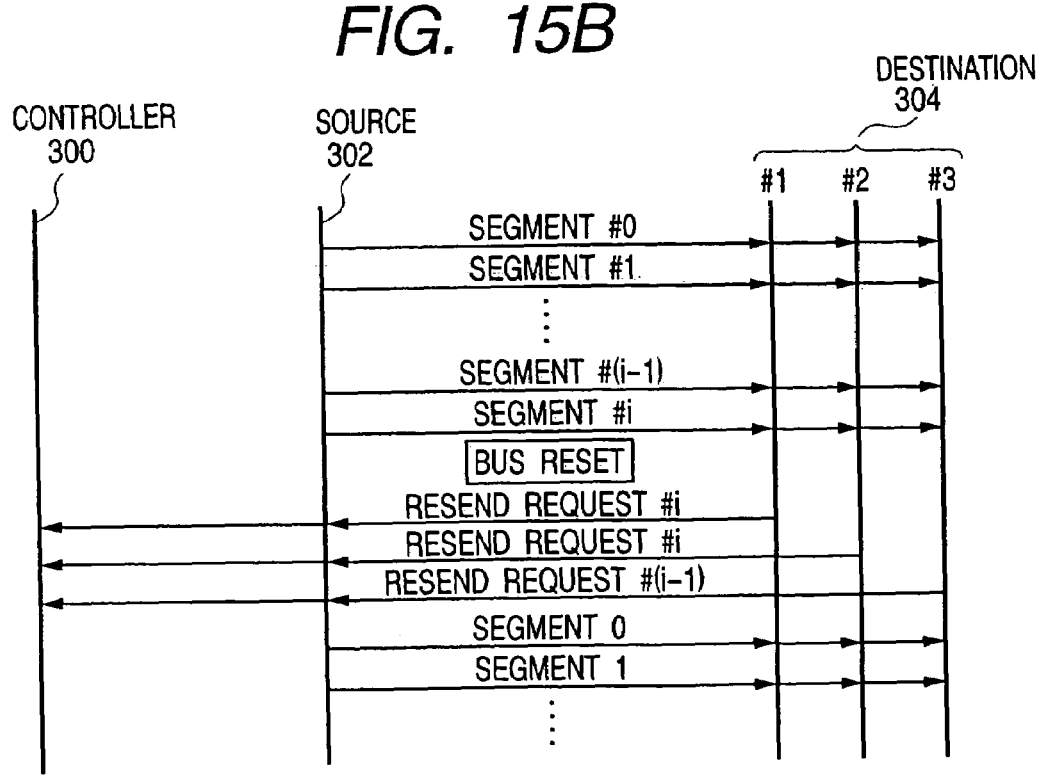
Figure 16:
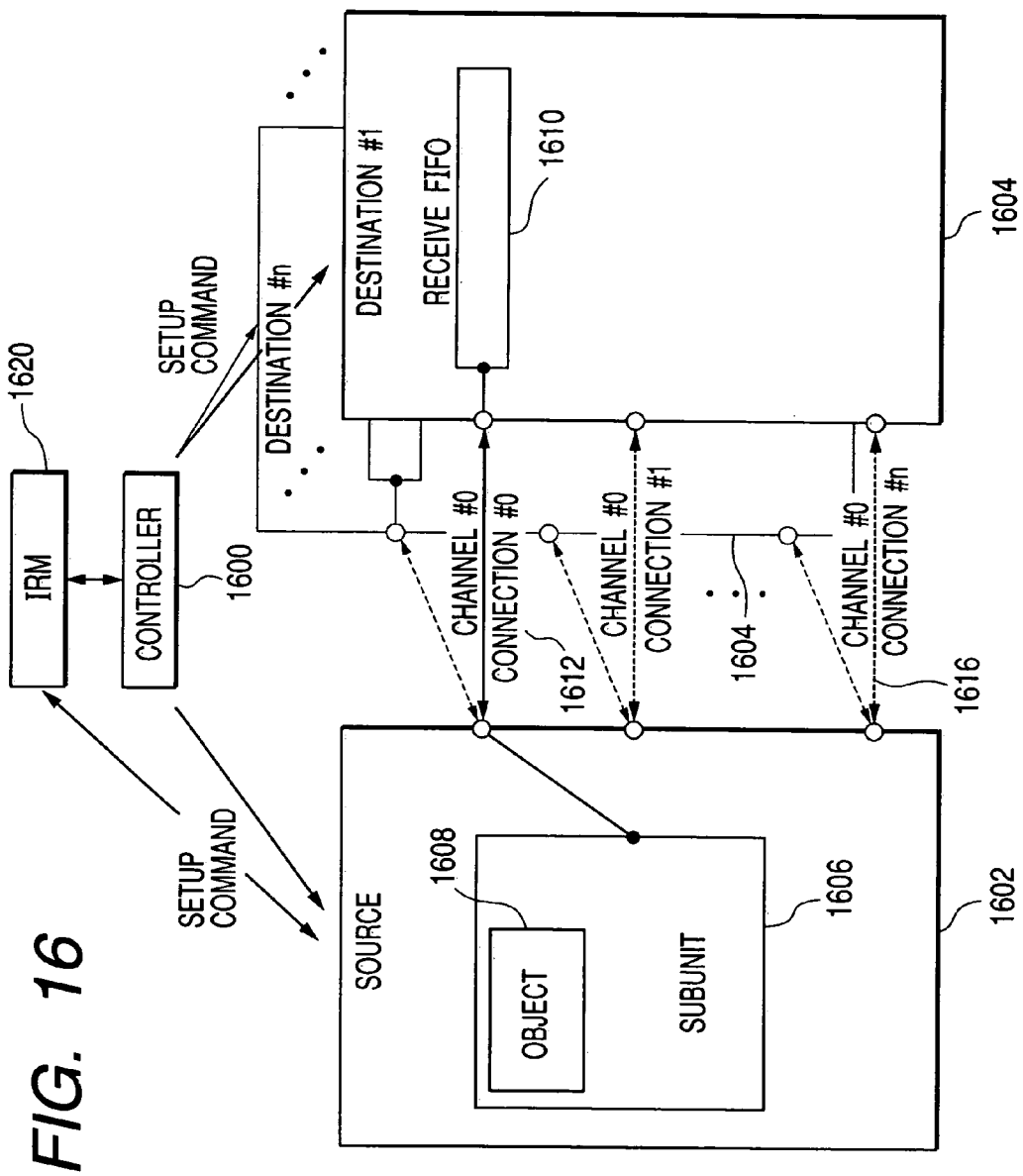
FIG. 16 is a conceptional view or explaining a fundamental construction of a communication protocol according to a second embodiment of the present invention.

For example, FIGS. 15A and 15B show examples that the object data 308 of the source node 302 is received by three destination nodes 304. At the time when the source node 302 finishes to transfer the segment data having the sequence number i, if the bus reset occurs, the node on the bus initialize the network in accordance with the IEEE 1394-1995 Standard and automatically effect re-recognizing process.

After the re-recognizing process for the bus is completed, each destination node 304 broadcasts resend request packet in which the connection ID and the sequence number of the segment data correctly received (before the bus reset occurs) are stored. For example, in FIGS. 15A and 15B, the Destination nodes #1, #2 could correctly receive the data having the sequence numbers up to i and Destination node #3 could correctly receive the data having the sequence numbers up ti (i−1). Accordingly, the source node 302 starts the re-sending from the segment data having the sequence number i.

In the illustrated embodiment, in case of FIG. 15A, the source node 302 selects the minimum number ((i−1) in this case) among the sequence numbers indicated by each resend request packet and starts the transferring from the segment data having sequence number i.

Further, as shown in FIG. 15B, although the source node 302 receives each resend request packet, the source node can start the re-sending from the segment data having the sequence number 0 without discriminating the minimum sequence number. In this case, the function for discriminating the minimum sequence number can be omitted.

In this way, when there are the plurality of destination nodes 304, even if the bus reset occurs, all of the destination nodes 304 can re-start the data transferring without loosing the object data.

Second Embodiment

Now, a communication protocol according to a second embodiment of the present invention will be briefly described with reference to FIG. 16.

In the above-mentioned first embodiment, the communication protocol in which the logical connection relationships are set between the source node 302 and one or more destination nodes 304 by using the connection ID and communication between one source node 302 and one destination node 304 is realized by using the connection ID and the asynchronous broadcast transaction was explained.

In the second embodiment, a communication protocol in which communication between one source node 1602 and one or more destination nodes 1604 is realized by using the aforementioned connection ID and an asynchronous streaming packet based upon IEEE 1394—a Standard will be described.

In this embodiment described hereinbelow, a transfer system in which a part or all of the object data 1608 (for example, still image data having one or more scenes, moving image data corresponding to predetermined time period, video data or text data corresponding to predetermined pages) is transferred by using an asynchronous streaming packet which will be described later is referred to as "asynchronous streaming transfer".

The asynchronous streaming transfer is carried out during the transferring period of the transfer system based upon the IEEE 1394-1995 Standard. Further, the asynchronous streaming transfer is adapted to be broadcasted on the communication system and is a communication system suitable for effecting the communication between one equipment and a plurality of equipments.

Similar to the isochronous transfer system, in the asynchronous streaming transfer, it is required that a predetermined channel number is set. Accordingly, in the illustrated embodiment, the channel number is set in each asynchronous streaming transfer by using isochronous response manager (referred to as "IRM" hereinafter) for managing the channel number used in the isochronous transfer system.

Now, in the illustrated embodiment, as is in the first embodiment, for example, the computer having the 1394 interface 14 will be explained as a controller 1600, the DVCR 28 having the 1394 interface 44 will be explained as a source node 1602, and the printer 60 having the 1394 interface 62 will be explained as a destination node 1603. Incidentally, in FIG. 2, while an example that the communication system is constituted by three communication apparatuses was explained, the present invention is not limited to such an example. For example, a communication system in which a plurality of computers 10, DVCRs 28 and printers 60 are connected may be used, and the communication apparatus constituting the destination node 1603 is not limited to one.

In FIG. 16, the reference numeral 1600 denotes a controller; 1602 denotes a source node; 1604 denotes a destination node; 1606 denotes a submit in the source node; 1608 denotes object data such as image data; 1610 denotes receiving FIFO in the destination node; 1612 denotes first connection; 1616 denotes n-th connection; and 1620 denotes IRM.

The controller 1600 is a node having a function for setting connection ID for establishing the connection between the source node 1602 and one or more destination nodes 1604 and for discriminating such connection.

The controller 1600 may be a node independent from the source node 1602 and the destination node 1604. Alternatively, the source node 1602 or the destination node 1604 may be the same as the controller 1600. In the latter case, the transaction between the source node 1602 or the destination node 1604 and the controller 1600 can be omitted. As is in the first embodiment, in the illustrated embodiment, an example that the controller 1600 is a node different from the source node 1602 and the destination node 1604 is shown.

In the communication apparatus according to the illustrated embodiment, a plurality of connections can be established. The controller 1600 sets the same channel number and connection ID in the source node 1602 and the destination node 1604 selected by the user, by using an asynchronous packet. The source node 1602 writes the object data 1608 such as image data from the internal subunit 1606 on the first receiving FIFO 1610 within the destination node by using the asynchronous streaming packet, for example, through the first connection 1612.

The asynchronous streaming packet used in this case is sent by the channel number designated by the controller 1600. The connection ID set by the controller 1600 is stored in the pay load of this packet as a part of data header information.

When receiving the asynchronous streaming packet having the channel number designated by the controller 1600, the destination node 1604 stores such packet in the receiving FIFO 1610 temporarily and analyzes the data header information during pay load. When this receiving packet has the connection ID designated by the controller 1600, the data from which the data header information is written in the internal buffer.

Also when there are plurality of destination nodes 1604, since each node can discriminate the predetermined connection by using the channel number and the connection ID, the source node 1602 can transfer the data to the plurality of destination nodes 1604 simultaneously.

Next, a construction of the communication packet used in the second embodiment will be explained with reference to FIGS. 17A and 17B. The communication packet used in this embodiment is, for example, a packet having a unit of 4 bytes (32 bits; referred to as "quadlet" hereinafter). In this communication packet, there are two formats, i.e., a packet of a type in which designating the node ID of the receiver (i.e., asynchronous packet) and a packet of a type for designating and broadcasting the channel number called as asynchronous streaming.

Figure 17A:
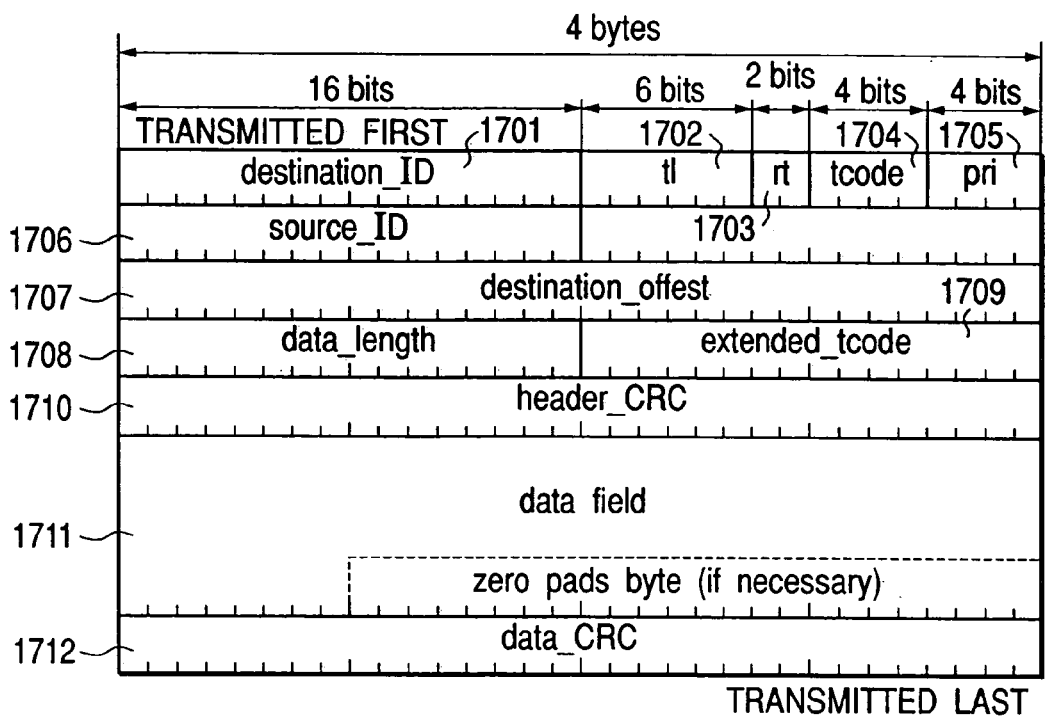
FIGS. 17A and 17B are views showing a construction of a communication packet used in the second embodiment.

The packet format shown in FIG. 17A is of the type for designating the node ID. As shown in FIG. 17A, a first field 1701 (16 bits) is a destination_ID field into which the node ID of the receiver is stored.

A next field 1702 (6 bits) is a transaction label (t1) field which is a tag inherent to each transaction.

A next field 1703 (2 bits) is a retry (rt) code which designates whether the packet tries to retry or not.

A next field 1704 (4 bits) is a transaction code (tcode). The tcode designates the type of the transaction to be executed and the format of the packet. In the illustrated embodiment, for example, this value is set to 0001 (binary scale). Thus, the transaction for writing the data block is requested.

A next field 1705 (4 bits) is a priority (pri) field for designating the preferential order. In the illustrated embodiment, a value of this field is set to 0000 (binary scale).

A next field 1706 (16 bits) is a source_ID field indicating node ID of the sender side. A next field 1707 (48 bits) is a destination_offset field for designating lower 48 bits for the address space of 64 bits of the destination node 1604.

A next field 1708 (16 bits) is a data_length field indicating a length of a data field (described later) as a byte unit.

A next field 1709 (16 bits) is an extended_tcode field. When the transaction for writing the data block used in the illustrated embodiment is requested, a value of this field is set to 0000 (16 scale).

A next field 1710 (32 bits) is a header_CRC field which is used for detecting an error of the packet header. The packet header is constituted by the fields 1701 to 1709.

A next field 1711 is a data field having a variable length, and this data field is referred to as "pay load". In the illustrated embodiment, when this data field is not multiple of the quadlet, bits shorter to the quadlet are filled with "0".

A next field 1712 (32 bits) is a data_CRC field which is used for detecting an error of the data field, similar to the header_CRC field.

Figure 17B:
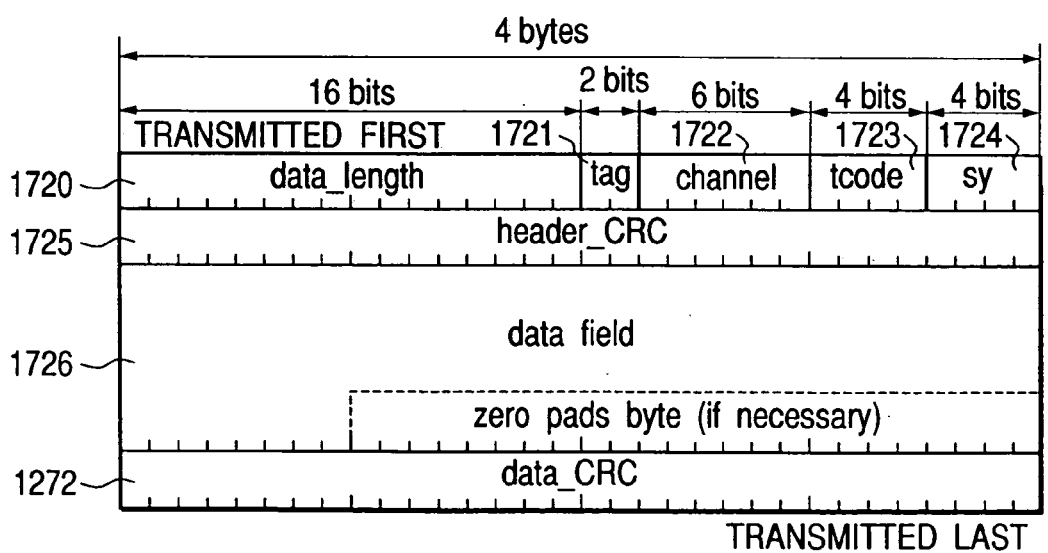

The packet format shown in FIG. 17B is format for a packet of a type designating the channel number (i.e., asynchronous streaming packet).

As shown in FIG. 17B, a first field 1720 (16 bits) is a data_length field indicating a length of a data field (described later) as a byte unit.

A next field 1721 (2 bits) is a tag field, and a value of this field is 00 (binary scale).

A next field 1722 (6 bits) is a channel field indicating the channel number of this packet. The receiving node discriminates the packet by using this channel number.

A next field 1723 (4 bits) is a transaction code (tcode). In the asynchronous streaming packet, a value of this field is A (16 scale).

A next field 1724 (4 bits) is a synchronization code (sy) field, and a value of this field is determined by application using this packet.

A next field 1725 (32 bits) is a header_CRC field which is used for detecting an error of the packet header. The packet header is constituted by the fields 1720–1724.

A next field 1726 is a data field having a variable length, and this field is referred to as "pay load". In the illustrated embodiment, when this data field is not multiple of the quadlet, bits shorter to the quadlet are filled with "0". A next field 1727 (32 bits) is a data_CRC field which is used for detecting an error of the data field, as is in the aforementioned header_CRC field.

Next, the asynchronous transaction effected between the controller 1600, source node 1602 and destination node 1604 shown in FIG. 16 and the IRM (node becoming isochronous resource manager) not shown in FIG. 16 will be explained with reference to FIGS. 18 and 19. Incidentally, in the following explanation, regarding FIG. 18, a sequence in which the connection is set between one source node 1602 and one destination node 1604 will be described, and, regarding FIG. 19, a sequence in which the connection is set between one source node 1602 and a plurality of destination nodes 1604 will be described.

The controller 1600 issues (read transaction) a read request packet to a CHANNELS_AVAILABLE register of the IRM 1620. When receiving the packet, the IRM 1620 sends the contents of the CHANNELS_AVAILABLE register to the controller 1600 as read response (1801 in FIGS. 18 and 19). Usage conditions of the channels at that point are set in this register, so that, by checking the data, non-used channels can be known. The controller 1600 selects one channel among the non-used channels.

Then, the controller 1600 issues (write transaction) set-up command for setting the connection to the source node 1602. The channel number selected by the controller 1600 and the connection ID controlled by the controller 1600 itself are written in this set-up command. When receiving the set-up command, the source node 1602 sends a response packet for the set-up command to the controller 1600 (1802 in FIGS. 18 and 19).

The source node 1602 to which the channel number was informed from the controller 1600 issues (read transaction) the read request packet to the CHANNELS_AVAILABLE register of the IRM 1620. When receiving the packet, the IRM 1620 sends the contents of the CHANNELS_AVAILABLE register to the source node 1602 as read response (1803 in FIGS. 18 and 19).

The source node 1602 sends a compare & swap lock request packet to the IRM 1620 by using this response data. This lock packet is a packet for rewriting the contents of the CHANNELS_AVAILABLE register informed from the controller 1600 (i.e., making the channel informed from the controller 1600 under usage). When the lock transaction becomes successful, the channel is ensured. The IRM sends the response packet for lock request to the source node 1602 (1804 in FIGS. 18 and 19).

Pursuant to the source node 1602, the controller 1600 sends (write transaction) set-up command for setting the connection to the destination node 1604. The channel number informed to the source node 1602 and the data same as the connection ID are written in the set-up command. The destination node 1604 sends the response packet for the set-up command (1805 in FIG. 18).

Figure 19:
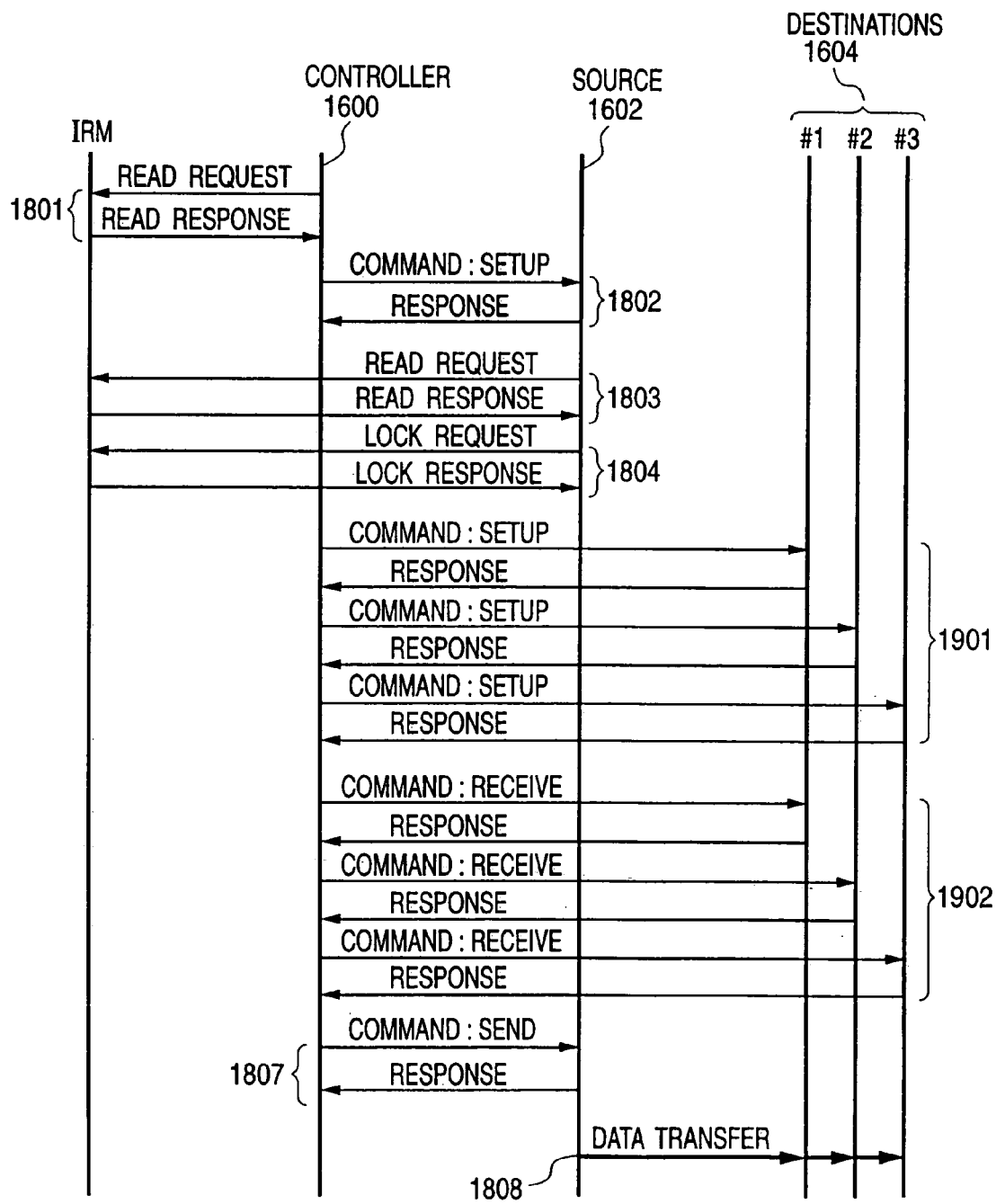
FIG. 19 is a sequence chart showing an example of another communication protocol according to the second embodiment.

Further, as shown in FIG. 19, when there are a plurality of destination nodes 1604, the set-up command is successively transferred to the respective destination nodes, thereby effecting set-up (1901 in FIG. 19).

By the above-mentioned sequences, the controller 1600 can set the common asynchronous stream channel and the common connection ID between the source node 1602 and the destination node 1604, thereby establishing the theoretical connection between the respective nodes.

Then, the controller 1600 sends (write transaction) data receiving command to the destination node 1604. The destination node 1604 which received this command prepares the receiving of data and sends the response packet to the controller 1600 (1806 in FIG. 18). As shown in FIG. 19, when there are a plurality of destination nodes 1604, the data receiving command is successively sent to the respective destination nodes. As a result, the destination nodes 1604 become a receive waiting condition (1902 in FIG. 19).

After the destination nodes become the receive waiting condition, the controller 1600 sends (write transaction) data sending command to the source node 1602. When receiving this command, source node 1602 sends the response packet to the controller 1600 (1807 in FIGS. 18 and 19). The above-mentioned transaction is effected by using the asynchronous packet shown in FIG. 17A.

Figure 20:
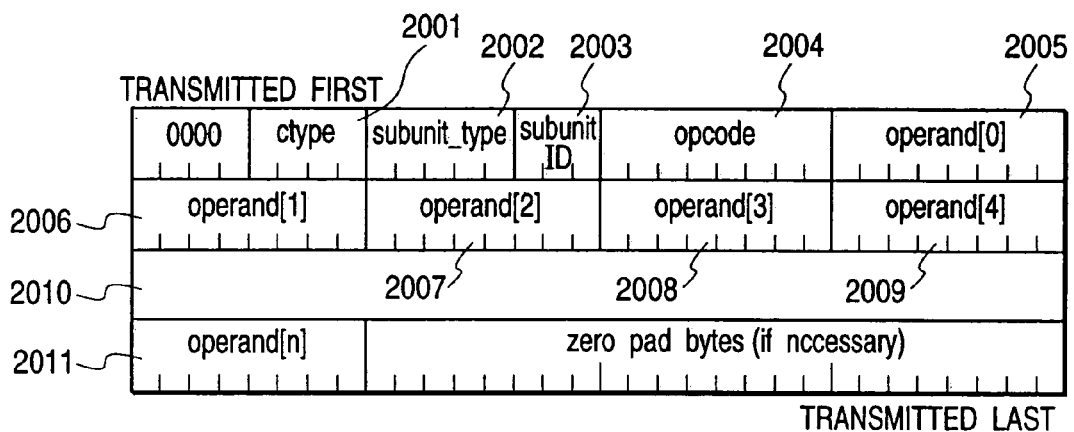
FIG. 20 is a view showing data format for command used in the second embodiment.

An example of data format of the command used in the set-up command, data receiving command and data sending command is shown in FIG. 20. After the command shown in FIG. 20 is set in the data field 1711 shown in FIG. 17A, the command is sent to the respective nodes by using the write transaction.

In FIG. 20, a type field 2001 indicates the kinds of commands. The following Table 1 shows several types of commands.

TABLE 1

| value | command type | meaning |
| --- | --- | --- |
| 0 | Control | control command |
| 1 | Status | query of equipment conditions |
| 2 | Inquiry | query of support condition of command |
| 3 | Notify | recognition of change in equipment conditions |

The above-mentioned commands designate the Control in the Table 1. A subunit_type field 2002 and a subunit ID field 2003 are fields indicating which command of unit in the node designated by the packet header is included in this packet. An opcode field 2004 and operand fields 2005–2011 are fields indicating the contents of the actual command.

Figure 21:
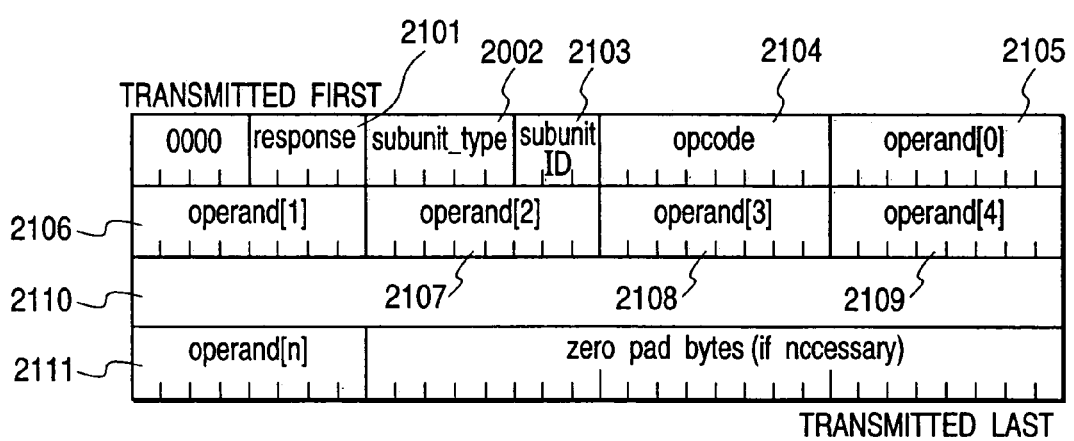
FIG. 21 is a view showing data format for response corresponding to the command shown in FIG. 20.

FIG. 21 shows an example of data format of response for the above-mentioned commands. The response shown in FIG. 21 is sent to the respective nodes after it is set in the data field 1711 shown in FIG. 17A.

In FIG. 21, a response field 2101 indicates the kinds of responses. The following Table 2 shows several types of responses.

TABLE 2

| value | response type | meaning |
| --- | --- | --- |
| 8 | Not implemented | command is not supported |
| 9 | Accepted | command was accepted |
| $A_{16}$ | Rejected | command is rejected |
| $F_{16}$ | Interim | return response later |

A subunit_type field 2102 and a subunit ID field 2103 are fields indicating the unit in the node from which the response is send. An opcode field 2104 and operand fields 2105–2111 are fields indicating the contents of the response.

For example, when the node which received the above-mentioned command from the controller 1600 receives the command, the node transfers a response packet in which "Accepted" is set in the response field 2101 to the controller 1600 by using the write transaction.

Figure 18:
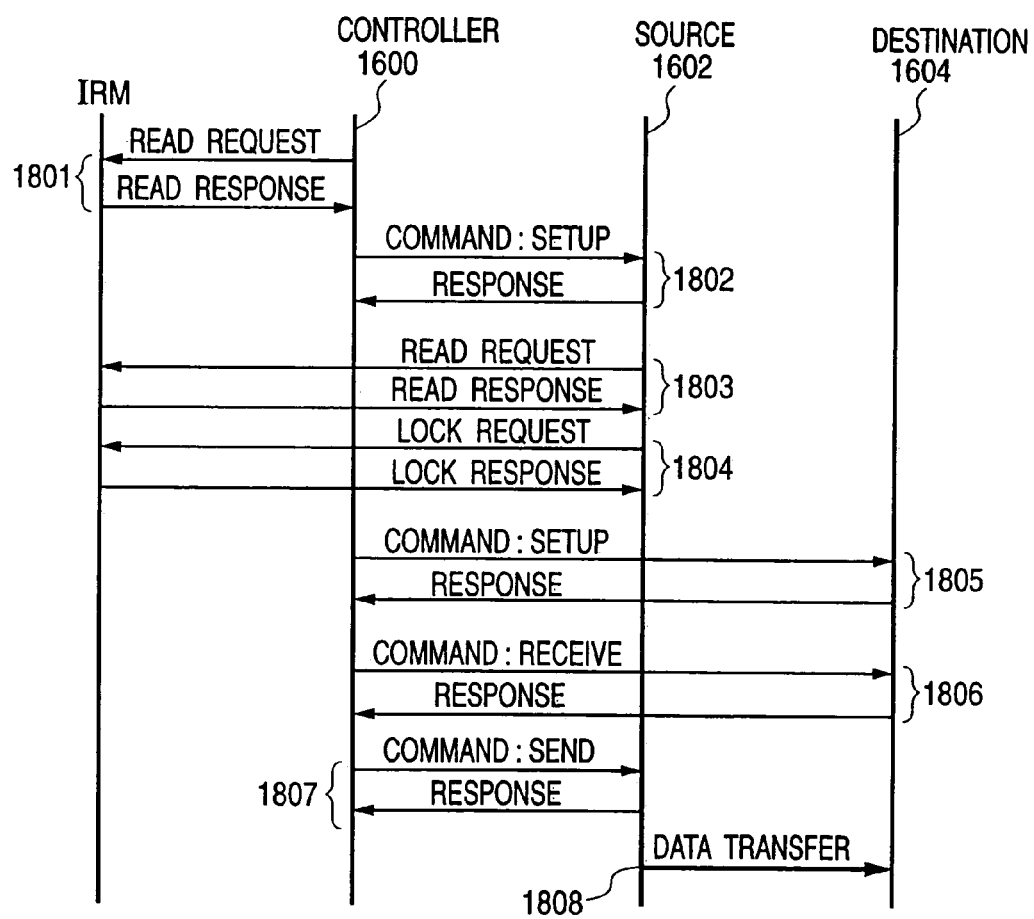
FIG. 18 is a sequence chart showing an example of a communication protocol according to the second embodiment.

In FIGS. 18 and 19, the source node 1602 which received the data sending command divides the previously selected object data 1308 into a plurality of segment data and successively transfers the segment data (1808 in FIGS. 18 and 19). The segment data are transferred by using the asynchronous streaming packet shown in FIG. 17B. In this case, the ensured channel number is written in the channel field shown in FIG. 17B is set by using the IRM.

Next, a sequence for dividing the object data 1608 and for successively transferring the divided data will be explained with reference to FIG. 22.

In the source node 1602, the object data 1608 having an image size of 128 KB has been selected in accordance with the above-mentioned communication sequence. The source node 1602 divides the object data 1608, for example, into 512 segments (1 segment=256 bytes) and transfers the segments to one or more destination nodes 1604 by the asynchronous streaming transfer using the predetermined channel.

Figure 22:
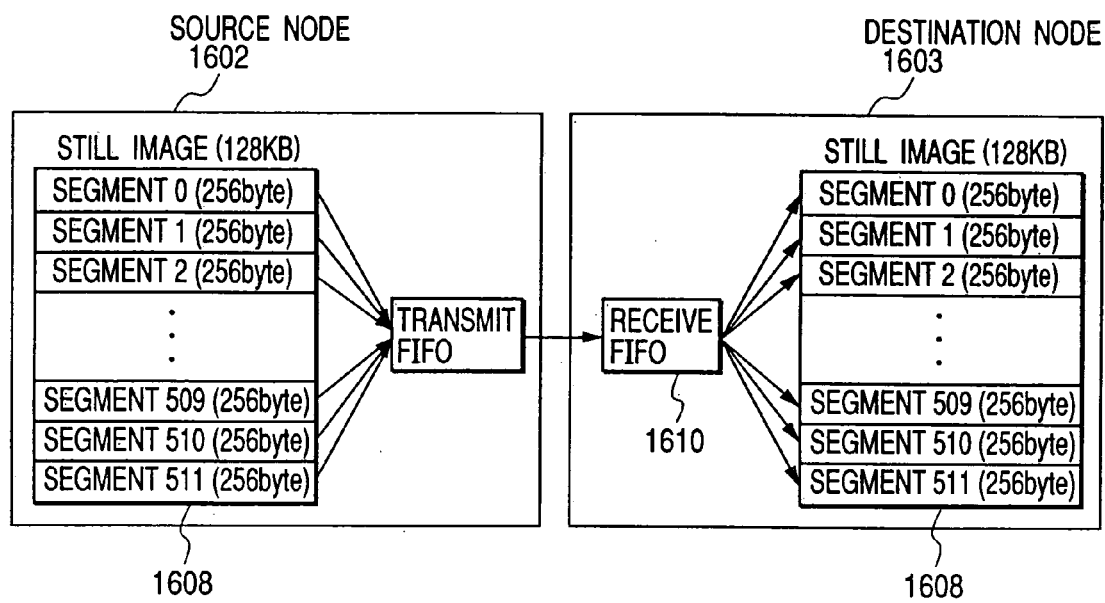
FIG. 22 is a view for explaining an example of a transfer model of object data in the second embodiment.

As shown in FIG. 22, the destination node 1604 takes the asynchronous streaming packet having the predetermined channel into its FIFO 1610 and discriminates whether it includes the set connection ID by checking the pay load of the packet. If the connection ID is included, the segment data included in the packet are successively stored in the internal buffer, and the object data 1608 from the source node 1602 is received.

Figure 23:
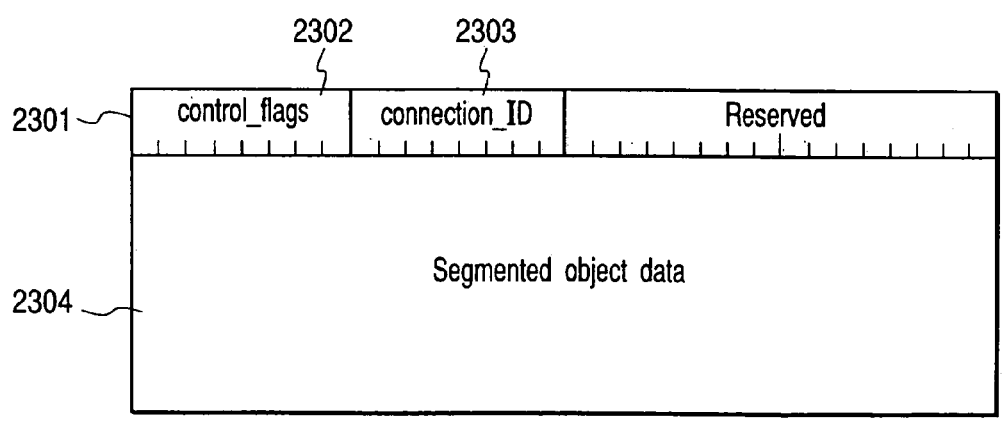
FIG. 23 is a view showing a construction of a data field of an asynchronous streaming packet used in the second embodiment.

FIG. 23 shows an example of data format for a part (i.e., 1 segment data) of the object data 1608 to be set in the data field 1726 shown in FIG. 17B.

In FIG. 23, a first one quadlet constitutes a header field 2301 (referred to as "stream info header" hereinafter). A control_flags field 2302 indicates the kind of data sent by this packet. The following Table 3 shows examples of the control_flags.

For example, in FIG. 22, "normal segment data" shown in the Table 3 is set in a packet for sending segment O-segment 510, and "segment data of object end" shown in the Table 3 is set in a packet for transferring segment 511 which is last data of the object data 1608.

TABLE 3

| value | meaning |
| --- | --- |
| 00$_{16}$ | normal segment data |
| 01$_{16}$ | segment data of object end |

The connection ID set by the controller is set in a connection_ID field 2303. Further, the divided object data 1608 (i.e., 1 segment data) is set in a segmented object data field 2304.

In case of the example shown in FIG. 22, the stream info header (4 bytes) and the segment data (256 bytes) (i.e., 260 bytes in total) constitute the pay load of one asynchronous streaming packet. The respective packets are successively transferred from the source node 1602 by using the channel number set by the aforementioned communication sequence.

When receiving the asynchronous streaming packet, each destination node 1604 checks the channel field 1722 of the packet header and judges whether the channel field coincides with the channel number informed from the controller or not. If the channel field coincides with the channel number, this packet is taken into the receiving FIFO 1610.

Further, each destination node 1604 judges whether the value of the connection_ID field of the stream info header 2301 of the taken packet coincides with the connection ID informed from the controller 1600 or not. If coincides, each destination node 1604 writes the segment data 2304 (except for 4 bytes of the stream info header 2301) in the internal buffer. Further, each destination node 1604 checks the control_flags field 2302 of the stream info header 2301 and judges whether this segment data is the last data of the object data 1608 or not.

In case of the example shown in FIG. 22, from start of the data transferring, "segment data of object end" is set in the control_flags field 2302 of the stream info header 2301 of the 512-th asynchronous streaming packet. At the time when the destination node 1604 writes the segment data included in this packet in the internal buffer, the transferring of the object data 1608 is finished.

Next, a flow of the data transfer 1808 shown in FIG. 19 will be fully explained with reference to FIG. 24. For example, when each segment data shown in FIG. 22 is transferred, the source node 1602 sets one segment data (as well as header information) in the pay load of the asynchronous streaming packet and transfers the data by using the predetermined channel.

Figure 24:
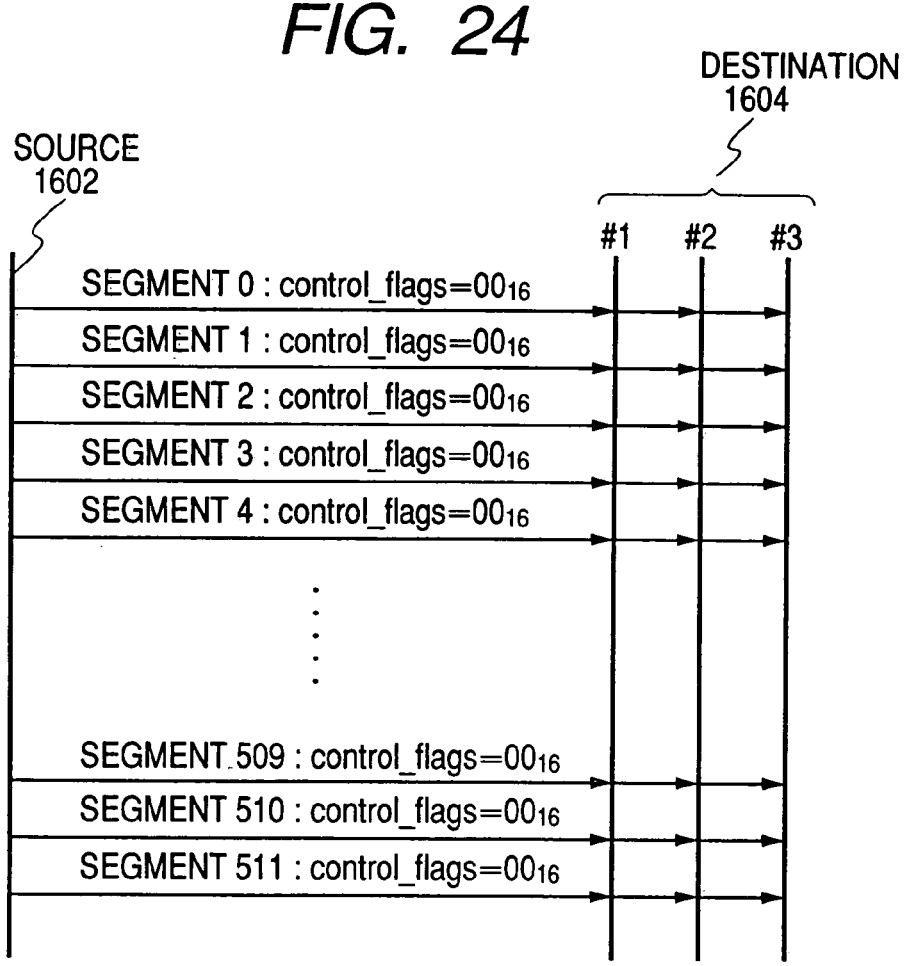
FIG. 24 is a sequence chart for fully explaining a data transfer flow shown in FIG. 19.

In this case, the connection ID informed from the controller 1600 is set in the connection_ID field 2303 of the header information within the pay load and values shown in the flow of FIG. 24 are set in the control_flags field 2302. When the segment 511 (last data) is transferred, "01h" indicating "segment data of object end" is set in the control_flags field 2302.

Each destination node 1604 receives the asynchronous streaming packet having the channel number informed from the controller 1600 and recognizes the contents of the header information in the pay load. When the connection ID coincides with the connection ID set in itself, the segment data are taken from the packet and are stored in the internal buffer successively.

When the control_flags field 2302 receives the asynchronous streaming packet having "01h", each destination node 1604 detects the fact that the receiving of the object data 1608 is completed and finishes the receiving operation. Each packet shown in FIG. 24 is broadcasted from the source node 1602 only once by the asynchronous streaming transaction. The plurality of destination nodes 1604 connected to the source node 1602 by the theoretical connection receive the packets simultaneously.

Further, when there is only one destination node 1604, the destination nodes 1604 shown in FIG. 24 is merely reduced to one, and the flow of the data transfer 1808 is the same as when there are the plurality of destination nodes.

In this way, by setting the same channel number and connection ID in one or more destination nodes 1604 and the source node 1602 by means of the controller 1600, the theoretical connection can be set between the source node 1602 and one or more destination nodes 1604. Further, the data transferring process can be effected by the transaction only between the source node 1602 and the destination node 1604 without presence of the controller 1600.

Particularly, by informing one source node 1602 and the plurality of destination nodes 1604 of the same channel number and connection ID, the theoretical connections having a ratio of 1:N can be set, and the data communication having a ratio of 1:N can be performed by using the same sequence as the ratio of 1:1.

Further, even when there are the plurality of destination nodes 1604, each segment is not required to be sent to each destination node independently, thereby reducing the traffic on the bus.

Third Embodiment

In a third embodiment of the present invention which will be described hereinbelow, a system and a communication protocol for transferring the object data 1608 to the destination node 1604 more positively by using the above-mentioned asynchronous streaming transfer is disclosed. Since a sequence in which the controller 1600 sets the theoretical connection between the source node 1602 and the destination node 1604 is the same as that (FIGS. 18 and 19) in the second embodiment, detailed explanation thereof will be omitted.

As is in the second embodiment, also in this embodiment, a case where the object data 1608 in FIG. 22 is transferred from the source node 1602 to the destination node 1604 will be described.

Figure 25:
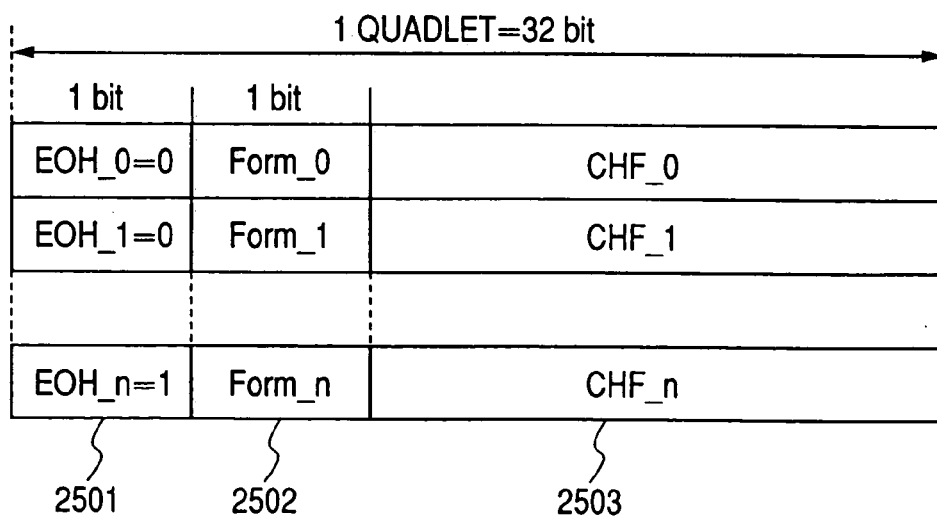
FIG. 25 is a view showing an example of format of an application header.

FIG. 25 shows an example of format for an application header to be stored in the asynchronous streaming packet in this embodiment. In the following explanation, this header is referred to as "common asynchronous streaming header" and is called as "CAP header" hereinafter. The CAP header is variable length data having a unit of 1 quadlet (32 bits).

In FIG. 25, a field 2501 is EOH_n (end of CAP header) indicating whether or not the CAP header having n-th quadlet is the last quadlet. For example, "0" indicates that this quadlet is followed by another quadlet data; whereas, "1" indicates that this quadlet is the last of the CAP header. A field 2502 is Form_n indicating a structure of CHF_n in combination with EOH. A field 2503 is CHF_n (CAP header field) having a structure depending upon a value of Form and EOH.

Figure 26:
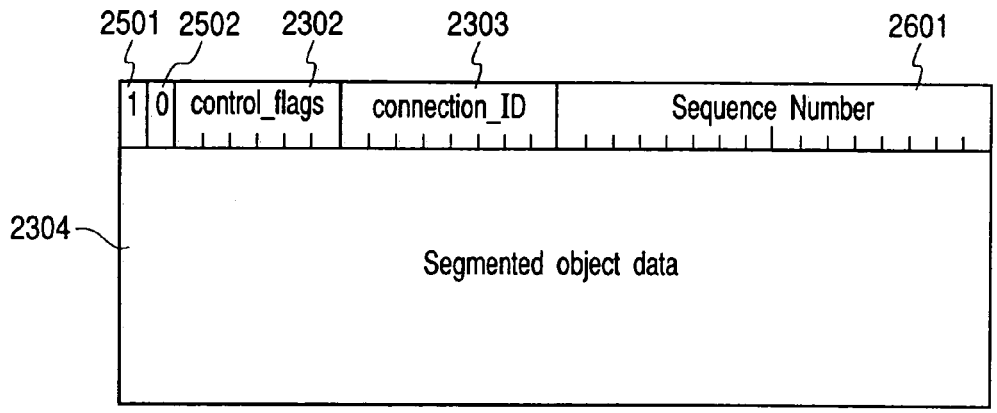
FIG. 26 is a view showing a construction of a data field of an asynchronous streaming packet used in a third embodiment of the present invention.

In the illustrated embodiment, as shown in FIG. 26, the CAP header is stored in the first one quadlet of the pay load of each asynchronous streaming packet, and the segment data are stored in the second, third and so on quadlets. In FIG. 26, EOH_0=1 and Form_0=0.

A connection_ID field 2303 and a control flags field 2302 shown in FIG. 25 are the same as those in the second embodiment. A sequence number field 2601 indicates serial numbers of the segment data sent by this packet. For example, as shown in FIG. 22, when the segment 0 is transferred, "0" is set in the segment number field 2601; whereas, when the segment 1 is transferred, "1" is set in the segment number field. As is in the second embodiment, divided object data are set in the segmented object data field 2304.

Figure 27:
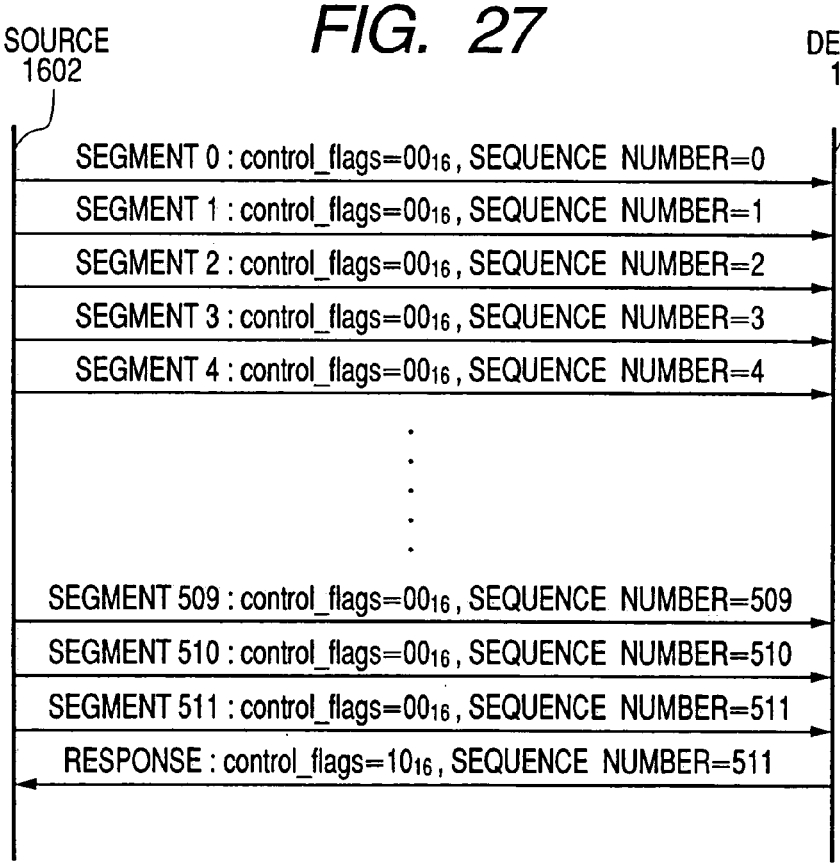
FIG. 27 is a sequence chart for fully explaining a data transfer flow according to the third embodiment.

Next, the data transfer according to the illustrated embodiment will be fully explained with reference to FIG. 27. In FIG. 27, as shown in FIG. 26, each segment data is set in the pay load of the asynchronous streaming packet together with the CAP header and is transferred from the source node 1602 by using the predetermined channel number. In this case, the connection ID informed from the controller 1600 is set in the connection_ID field 2303 of the CAP header and values shown in FIG. 27 are set in the control flags field 2302 and the sequence number field 2601. When the segment 511 (last data) is sent, "01h" indicating "segment data of object end" is set in the control_flags field 2302.

Figure 28:
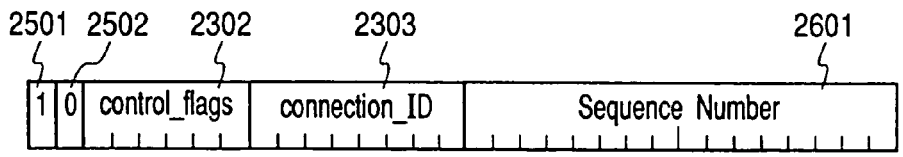
FIG. 28 is a view for explaining a construction of a response packet used in the third embodiment.

The destination node 1604 receives the asynchronous streaming packet having the channel number informed from the controller 1600 and recognizes the contents of the CAP header. Further, the destination node judges whether the contents coincide with the connection ID set in itself. If coincide, the contents are successively stored in the internal buffer. When the control_flags field 2302 receives the asynchronous streaming packet having "01h", the destination node 1604 sends the response packet indicating the fact that the receiving of the object data 1608 is completed, by using the asynchronous streaming transfer. FIG. 28 shows an example of format for this packet.

FIG. 28 is a view showing a construction of the data field 1726 of the response packet. The cap header having one quadlet amount is set in this packet. The channel number in this case is the same as the channel number used by the source node 1602 to transfer the object data 1608, and the connection_ID within the CAP header is also the same as the connection ID used by the source node 1602 to transfer the object data 1608.

The data indicating the kind of response is stored in the control_flags field 2302. The following Table 4 shows examples of the kinds. When all of the object data 1608 are received correctly, "10h" indicating "sequence number" is set. Further, when receiving correctly, the sequence number of the last data is set in the sequence number field 2601.

TABLE 4

| value | meaning |
| --- | --- |
| $10_{16}$ | receive success |
| $11_{16}$ | resend request |

When the source node 1602 transfers the last data of the object data 1608, the source node is waiting for response from the destination node 1604. When the asynchronous streaming packet having the same channel as the channel number used for transferring the object data 1608 is received, the source node 1602 checks the CAP header in this packet and judges whether the object data 1608 is correctly received or not, and the transferring the object data 1608 is finished.

Figure 29:
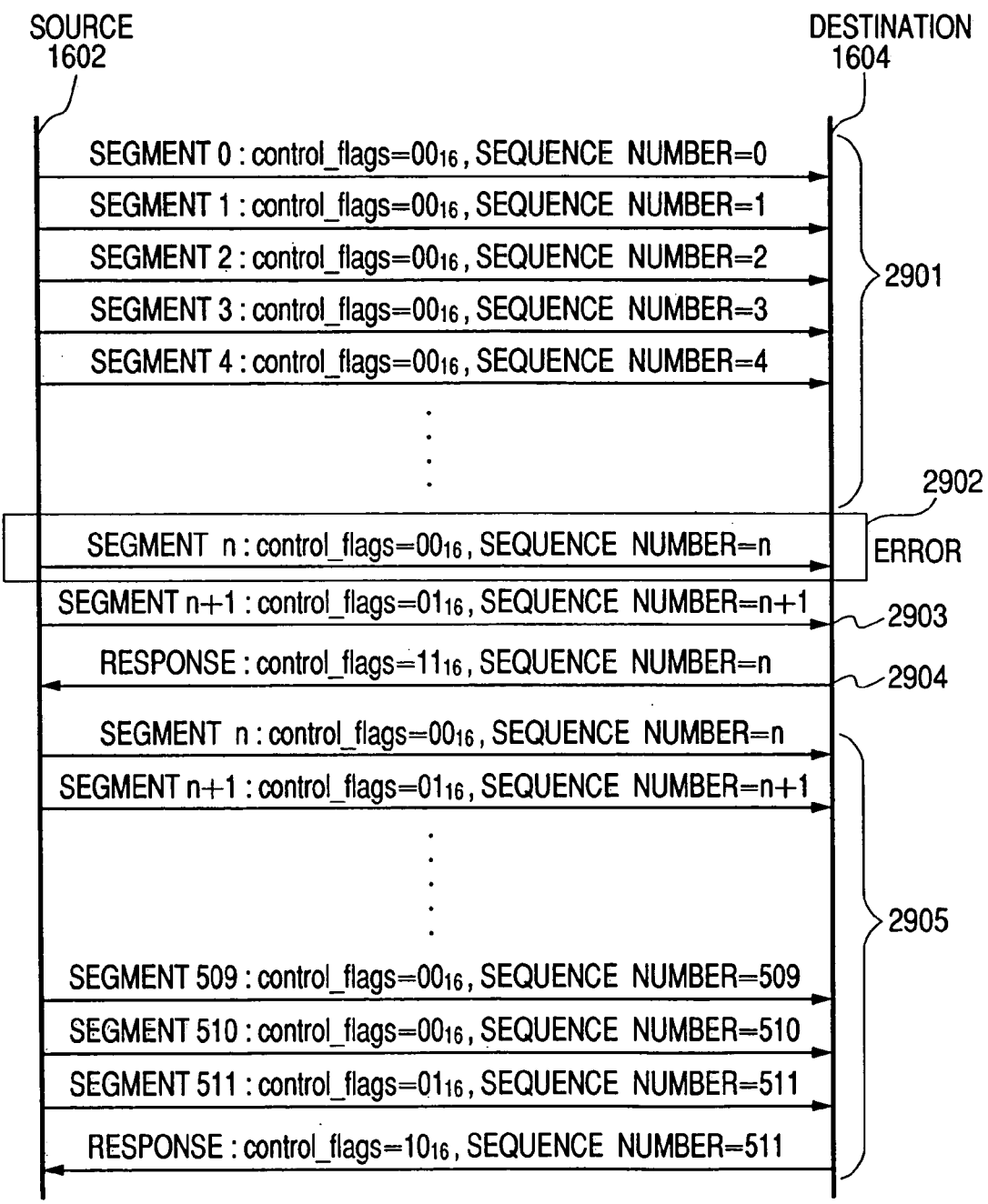
FIG. 29 is a sequence chart for explaining a communication sequence when an error occurs during the transferring of object data.

Next, a flow if any error occurs during the transferring of the object data 1608 will be explained with reference to FIG. 29. After the connection is set in the similar sequence to the second embodiment, the source node 1602 starts the transferring of the object data 1608 (2901 in FIG. 29). If the segment n could not received by the destination node 1604 for any reason (2902 in FIG. 29), at the time when the segment (n+1) is received, the destination node 1604 detects the fact that the segment n is lost (2903 in FIG. 29). At this point, the destination node 1604 sends the response packet requesting the resend of the segment n to the source node 1602 by using the asynchronous streaming transfer (2904 in FIG. 29).

The format for this packet is the same as the above-mentioned response packet and is transferred by using the same channel number and connection ID as those used by the source node 1602. "11h" indicating "resend request" is set in the control flags field 2302 within the CAP header, and the sequence number corresponding to the segment data which could not be received is set in the sequence number field.

When the source node 1602 receives the asynchronous streaming packet having the channel same as the channel number used for transferring the object data 1608, the source node 1602 checks the CAP header within the packet. When it is recognized that this packet is the response requesting "resend request", the source node 1602 starts the re-sending from the segment data corresponding to the designated sequence number (2905 in FIG. 29). In a subsequent data transferring flow, the transferring is effected in accordance with the aforementioned sequence.

Figure 30:
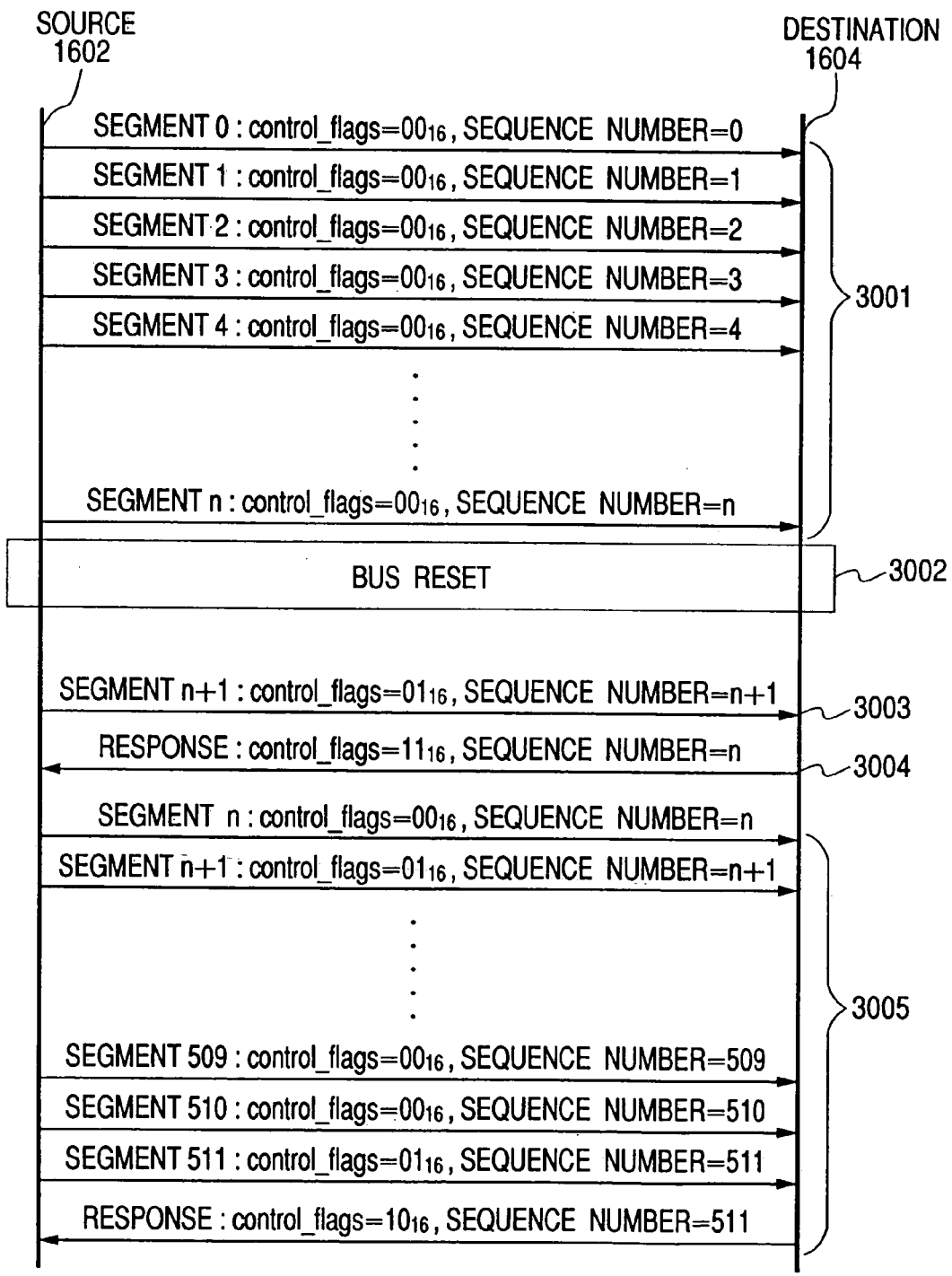
FIG. 30 is a sequence chart for explaining a communication sequence when bus reset occurs during the transferring of object data.

Next, a flow if the bus reset occurs during the transferring of the object data 1608 will be explained with reference to FIG. 30. After the connection is set in the similar sequence to the second embodiment, the source node 1602 starts the transferring of the object data 1608 (3001 in FIG. 30). If the bus reset occurs after the transferring of the segment n, the nodes on the bus effect initialization and re-construction of the bus in a predetermined sequence (3002 in FIG. 30).

When the re-construction of the bus is finished, the source node 1602 and the destination node 1604 re-start the object data before the bus reset occurs, by using the channel number and connection ID set by the controller 1600 before the bus reset occurs. In this case, the source node 1602 re-starts the data sending from the segment data pursuant to the segment data sent before the bus reset occurs (3003 in FIG. 30).

When the segment data received after the bus reset occurs is data pursuant to the segment data received before the bus reset occurs, the destination node 1604 continues the receiving. However, if the segment data prior to the segment data received after the bus reset occurs is not received correctly, similar to the sequence shown in FIG. 29, the response packet requesting the re-sending of the segment n is transferred (3004 in FIG. 30). The source node 1602 starts the data transferring again from the segment n. In a subsequent data transferring flow, the transferring is effected in accordance with the aforementioned sequence (3005 in FIG. 30).

In this way, by providing the header within the pay load to add the information of the segment data, the data communication can be effected positively by using the asynchronous streaming transfer, and, even if the error and/or the bus reset occur, the object data can be transferred to one or more destination nodes 1604 without loosing the data.

As mentioned above, in the above-mentioned embodiments, the logical connection relationship not depending upon the physical connecting styles can be formed within the network of bus type such as stipulated in the IEEE 1394-1995 Standard.

Further, according to the illustrated embodiments, in the communication system based upon the IEEE 1394-1995 Standard, there can be provided a new communication protocol in which a relatively large amount of object data (for example, still image data, graphic data, text data file data, program data or the like) not requiring the real time ability but requiring the responsibility is divided into one or more segment data which are in turn transferred continuously.

In addition, according to the illustrated embodiments, in the communication system based upon the IEEE 1394-1995 Standard, there can be provided a new communication protocol for realizing data communication between a plurality of equipments by using a communication system for broadcasting the data asynchronous transferring.

Further, according to the illustrated embodiments, a plurality of data having continuity can positively be transferred without using the isochronous transfer system based upon the IEEE 1394-1995 Standard. In addition, one object data can be transferred positively by dividing the object data into a plurality of data.

Furthermore, according to the illustrated embodiments, by controlling the communication between a plurality of equipments by one connection, many communications can be achieved simultaneously without using communication band not so much.

Lastly, according to the illustrated embodiments, even if the data transferring is interrupted due to occurrence of the bus reset or communication error, it is possible to know which segment data is lost, and the transferring can be re-started without complicated communication sequence.

Other Embodiments

The protocols explained in the illustrated embodiments and various processing operations required for realizing the protocols can be effected by software.

For example, a recording medium storing program code for realizing the functions in the illustrated embodiments is supplied to a control unit (for example, system controller 50, printer controller 68 or MPU 12 in FIG. 2) of the equipments constituting the communication protocol according to the illustrated embodiments. And, when the control unit is designed to read-out the program code stored in the recording medium and control the operation of the communication system or the equipment itself to realizing the functions according to the illustrated embodiments, such embodiments can be performed.

Further, a recording medium storing program code for realizing the functions in the illustrated embodiments is supplied to the 1394 interfaces 14, 44, 62 of the equipments so that a control unit (for example, serial bus management 806 in FIG. 8) for controlling the operation of the 1394 interfaces 14, 44, 62 may control the processing operations to realize the functions in the illustrated embodiments in accordance with the program code stored in the recording medium.

In this case, the program code itself read-out from the recording medium realizes the functions in the illustrated embodiments, and the program code itself and a means (for example, recording medium itself) for supplying the program code to the control unit constitute the present invention.

The recording medium for storing such program code may be, for example, a floppy disc, a hard disc, an optical disc, a photo-magnetic disc, CD-ROM, a magnetic tape, a non-volatile memory card or ROM.

Further, it should be noted that the present invention includes a case where the program code read-out from the recording medium cooperates with an OS (operating system) or various application software to realize the functions in the illustrated embodiments.

Lastly, it should be noted that the present invention includes a case where, after the program code read-out from the recording medium is stored in a memory of a function expanding unit connected to the control unit, a control unit of the function expanding unit performs a part or all of the actual process in accordance with the program code stored in the memory to realize the functions in the illustrated embodiments.

The invention may be embodied in other specific forms without departing from the spirit and essential characteristics thereof.

For example, in the illustrated embodiments, while an example that the communication protocol can be applied to the network based upon the IEEE 1394-1995 Standard was explained, the present invention is not limited to such an example. The communication protocol according to the illustrated embodiment can be applied to a network of bus type such as stipulated in the IEEE 1394-1995 Standard or a network imaginarily constructing a network of bus type.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. A communication system comprising:
a source node;
one or more destination nodes; and
a controller adapted to set a logical connection between the source node and the one or more destination nodes,
wherein the controller is adapted to notify the source node and the one or more destination nodes of first information representing the logical connection and second information that is unique to the controller,
the source node is adapted to divide data to be transmitted to the one or more destination nodes into a plurality of segment data, and transfer each of the segment data with the first and second information obtained from the controller to the one or more destination nodes, and
each of the one or more destination nodes includes a receiving buffer, and is adapted to store each segment data in the receiving buffer.

2. The communication system according to claim 1, wherein each of the one or more destination nodes is adapted to notify the source node of information about a size of the receiving buffer after preparation for receiving the segment data is completed.

3. The communication system according to claim 1, wherein the source node and the one or more destination nodes include a data communication unit that conforms to an IEEE1394-1995 standard.

4. A method for a communication system that includes a source node, one or more destination nodes, and a controller, the method comprising steps of:
setting a logical connection between the source node and one or more destination nodes;
notifying the source node and the one or more destination nodes of first information representing the logical connection and second information that is unique to the controller;
dividing data to be transmitted to the one or more destination nodes into a plurality of segment data;
transferring each of the segment data with the first and second information obtained from the controller from the source node to the one or more destination nodes; and
storing each of the segment data in a receiving buffer of each of the one or more destination nodes.

5. The method according to claim 4, further comprising a step of notifying the source node of information about a size of the receiving buffer from each of the one or more destination nodes after preparation for receiving the segment data is completed.

6. The method according to claim 4, wherein the source node and the one or more destination nodes include a data communication unit that conforms to an IEEE 1394-1995 standard.

7. A controller comprising:
a control unit adapted to set a logical connection between a source node and one or more destination nodes,
wherein the controller is adapted to notify the source node and one or more destination nodes of first information representing the logical connection and second information that is unique to the controller,
wherein the source node is adapted to divide data to be transmitted to the one or more destination nodes into a plurality of segment data, and transfer each of the segment data with the first and second information obtained from the controller to the one or more destination nodes, and
wherein each of the one or more destination nodes includes a receiving buffer and is adapted to store each of the segment data in the receiving buffer.

8. The controller according to claim 7, wherein each of the one or more destination nodes is adapted to notify the communication apparatus of information about a size of the receiving buffer to after preparation for receiving the segment data is completed.

9. The controller according to claim 7, further comprising a data communication unit that conforms to an IEEE 1394-1995 standard.

* * * * *

UNITED STATES PATENT AND TRADEMARK OFFICE
CERTIFICATE OF CORRECTION

PATENT NO. : 7,002,964 B1
APPLICATION NO. : 09/252925
DATED : February 21, 2006
INVENTOR(S) : Shinji Ohnishi et al.

It is certified that error appears in the above-identified patent and that said Letters Patent is hereby corrected as shown below:

COLUMN 3

Line 25, "The the" should read --The--.

COLUMN 4

Line 3, "embodiment" should read --embodiments--;
    Line 9, "acceding" should read --according--;
    Line 11, "or" should read --for--; and
    Line 43, "or" should read --for--.

COLUMN 5

Line 18, "embodiment" should read --embodiments--; and
    Line 33, "mouth," should read --mouse,--.

COLUMN 6

Line 42, "softward" should read --software--;
    Line 56, "soft" should read --software--; and
    Line 57, "ware" should be deleted.

COLUMN 8

Line 61, "soft" should read --software--.

COLUMN 14

Line 26, "loosing" should read --losing--.

COLUMN 15

Line 62, "limited" should read --limited to--.

COLUMN 16

Line 18, "protocol type," should read --protocol-type,--.

UNITED STATES PATENT AND TRADEMARK OFFICE
CERTIFICATE OF CORRECTION

PATENT NO.       : 7,002,964 B1
APPLICATION NO.  : 09/252925
DATED            : February 21, 2006
INVENTOR(S)      : Shinji Ohnishi et al.

It is certified that error appears in the above-identified patent and that said Letters Patent is hereby corrected as shown below:

COLUMN 17

Line 10, "is" should read --are--; and
    Line 34, "send" should read --sent--.

COLUMN 18

Line 31, "1204" should read --(1204--;
    Line 46, "as" should read --as in--;
    Line 48, "difference" should read --different--; and
    Line 53, "thee" should read --three--.

COLUMN 19

Line 65, "initialize" should read --initializes--; and
    Line 66, "effect" should read --effects--.

COLUMN 20

Line 8, "up" should read --up to--;
    Line 25, "loosing" should read --losing--; and
    Line 44, "IEEE 1394—a" should read --IEEE 1394-1995--.

COLUMN 24

Line 57, "send." should read --sent.--.

COLUMN 25

Line 33, "segment O-segment" should read --segment 0-segment--.

COLUMN 28

Line 29, "transferring" should read --transferring of--;
    Line 36, "not" should read --not be--; and
    Line 49, "control flags" should read --control_flags--.

UNITED STATES PATENT AND TRADEMARK OFFICE
CERTIFICATE OF CORRECTION

PATENT NO. : 7,002,964 B1
APPLICATION NO. : 09/252925
DATED : February 21, 2006
INVENTOR(S) : Shinji Ohnishi et al.

It is certified that error appears in the above-identified patent and that said Letters Patent is hereby corrected as shown below:

COLUMN 29

Line 29, "loosing" should read --losing--; and
Line 40, "text data" should read --text data,--.

Signed and Sealed this

Third Day of April, 2007

JON W. DUDAS
*Director of the United States Patent and Trademark Office*